United States Patent
Seguchi et al.

(10) Patent No.: US 6,998,757 B2
(45) Date of Patent: Feb. 14, 2006

(54) MULTI-ROTOR SYNCHRONOUS MACHINE PERMITTING RELATIVE MOVEMENT BETWEEN ROTORS

(75) Inventors: Masahiro Seguchi, Oobu (JP); Shigenori Yoneda, Kariya (JP)

(73) Assignee: Denso Corporation, Kariya (JP)

( * ) Notice: Subject to any disclaimer, the term of this patent is extended or adjusted under 35 U.S.C. 154(b) by 117 days.

(21) Appl. No.: 10/849,427

(22) Filed: May 20, 2004

(65) Prior Publication Data

US 2004/0232800 A1 Nov. 25, 2004

Related U.S. Application Data

(62) Division of application No. 09/950,823, filed on Sep. 13, 2001, now abandoned.

(30) Foreign Application Priority Data

Sep. 14, 2000 (JP) ........................................ 2000-280608
Oct. 26, 2000 (JP) ........................................ 2000-326673
Jun. 21, 2001 (JP) ........................................ 2001-188641

(51) Int. Cl.
H02K 16/02 (2006.01)
H02K 21/00 (2006.01)
H02K 7/18 (2006.01)

(52) U.S. Cl. ........................ 310/266; 310/114; 310/68 B
(58) Field of Classification Search ................. 310/266, 310/112–114, 156.24, 156.17, 68 B; 318/254, 318/370
See application file for complete search history.

(56) References Cited

U.S. PATENT DOCUMENTS

| | | | |
|---|---|---|---|
| 3,306,407 A | 2/1967 | Smirl et al. | 192/85 AA |
| 4,305,031 A | 12/1981 | Wharton | 322/29 |
| 4,731,554 A | 3/1988 | Hall et al. | 310/67 R |
| 4,958,095 A | 9/1990 | Uchida et al. | 310/59 |
| 5,200,660 A | 4/1993 | Heidelberg et al. | 310/114 |
| 5,260,642 A | 11/1993 | Huss | 322/51 |
| 5,821,710 A | * 10/1998 | Masuzawa et al. | 318/254 |
| 5,955,807 A | 9/1999 | Kajiura et al. | 310/156.66 |
| 6,049,152 A | 4/2000 | Nakano | 310/114 |
| 6,462,430 B1 | * 10/2002 | Joong et al. | 290/40 C |
| 6,563,246 B1 | * 5/2003 | Kajiura et al. | 310/162 |
| 2002/0047418 A1 | 4/2002 | Seguchi et al. | 310/114 |

FOREIGN PATENT DOCUMENTS

| | | |
|---|---|---|
| DE | 3013424 | 10/1981 |
| DE | 3317553 | 11/1984 |

(Continued)

*Primary Examiner*—Karl Imayoshi Tamai
(74) *Attorney, Agent, or Firm*—Posz Law Group, PLC

(57) ABSTRACT

A compact and reliable structure of a multi-rotor synchronous machine which may be employed as a generator/motor for automotive vehicles is provided. The machine includes an outer rotor having permanent magnets, an inner rotor having permanent magnets disposed to be rotatable relative to the outer rotor, a stator core having armature coils interlinking with field magnetic fluxes produced by the outer and inner rotors, and a rotor-to-rotor relative rotation controlling mechanism. A relative angle between the outer and inner rotors is controlled within a given angular range by controlling the phase and quantity of current flowing through the armature coils to rotate the inner rotor relative to the outer rotor through the rotor-to-rotor relative rotation controlling mechanism, thereby changing the magnetic fluxes interlinking with the armature coils as needed.

8 Claims, 24 Drawing Sheets

FOREIGN PATENT DOCUMENTS

| | | |
|---|---|---|
| DE | 197 04 652 | 7/1998 |
| EP | 0 901 923 | 3/1999 |
| EP | 0 945 965 | 9/1999 |
| EP | 1 919 673 | 3/2002 |
| GB | 2 098 697 | 11/1982 |
| JP | A-63-309771 | 12/1988 |
| JP | A-8-238946 | 9/1996 |
| JP | A-10-61462 | 3/1998 |
| JP | A-10-304633 | 11/1998 |
| JP | A-11-78558 | 3/1999 |
| WO | WO 0006920 | 2/2000 |

* cited by examiner

NORMAL DIRECTION OF ROTATION

220 OUTER ROTOR

230 INNER ROTOR

220 OUTER ROTOR
230 INNER ROTOR

DIRECTION OF ROTATION

MULTI-ROTOR SYNCHRONOUS MACHINE PERMITTING RELATIVE MOVEMENT BETWEEN ROTORS

This application is a divisional application of U.S. patent application Ser. No. 09/950,823, filed Sep. 13, 2001, now abandon which is based on and incorporates herein by reference Japanese Patent Application No. 2000-280608 filed on Sep. 14, 2000.

BACKGROUND OF THE INVENTION

1. Technical Field of the Invention

The present invention relates generally to a multi-rotor synchronous machine which may be used as a generator/motor for automotive vehicles such as hybrid vehicles, and more particularly to a compact and reliable structure of a multi-rotor synchronous machine.

2. Background Art

Typical permanent magnet synchronous machines are capable of producing a higher output and have the structure easy to reduce in size as compared with other types of synchronous machines and thus suitable for use as driving motors of hybrid vehicles or electric vehicles. However, increasing a magnet-produced magnetic field in such a driving motor in order to ensure a sufficient torque during rotation of the motor at low speeds causes an excessive armature winding-induced voltage to be applied to semiconductor elements of a driving circuit during rotation at high speeds undesirably. In order to avoid this problem, any means is needed which is designed to reduce the magnetic field produced during rotation of the motor at high speeds.

U.S. Pat. No. 5,955,807 (Japanese Patent First Publication No. 10-304633), issued on Sep. 21, 1999, assigned to the same assignee as that of this application teaches a stationary field coil/magnet synchronous machine which includes permanent magnets installed in a rotor core, magnetically coupling members inserted into the rotor core in an axial direction thereof to short-circuiting the permanent magnets magnetically, a stationary yoke installed inside the rotor core, field coils provided around the rotor core. The synchronous machine works to energize the field coils to regulate the quantity of magnetic flux flowing through the magnetically coupling members to control an effective quantity of magnetic flux interlinking with the armature windings, thereby regulating the voltage generated by the armature windings.

EP 0901923 A2 discloses an automotive rear-mounted motor generator which is disposed between a crankshaft and a transmission and driven by the crankshaft. The user of the rear-mounted motor generator allows auxiliary mechanical parts to be mounted along a belt in front of the engine which also serve to minimize the slippage of the belt on a small-diameter pulley for driving the motor generator.

The synchronous machine, as taught in the former document, has a problem that the structure is complex.

The motor generator, as taught in the latter document, encounters drawbacks in that the mounting of the motor generator between the crankshaft and the transmission installed behind the crankshaft causes the overall length of the power train to be increased, thus resulting in increases in size and weight of an assembly of the power train and its cover and also results in a difficulty in ensuring the rigidity sufficient to resist mechanical vibrations and deformation of the power train.

SUMMARY OF THE INVENTION

It is therefore a principal object of the invention to avoid the disadvantages of the prior art.

It is another object of the invention to provide a compact structure of a multi-rotor synchronous machine designed to operate selectively in a motor mode and a generator mode with high reliability levels.

According to one aspect of the invention, there is provided a multi-rotor synchronous machine which may be employed in a generator/motor for automotive vehicles. The multi-rotor synchronous machine includes: (a) a first rotor having permanent magnet field poles, secured to an output member; (b) a second rotor having permanent magnet field poles, disposed to be rotatable relative to the first rotor; (c) a stator core having armature coils interlinking with field magnetic fluxes produced by the permanent magnet field poles of the first and second rotors; and (d) a rotor-to-rotor relative rotation controlling mechanism designed to allow the second rotor to rotate relative to the first rotor within a given angular range and prohibit the second rotor from rotating out of the given angular range In the preferred mode of the invention, the rotor-to-rotor relative rotation controlling mechanism includes a first stopper working to limit rotation of the second rotor relative to the first rotor in a first direction over a first angular range and a second stopper working to limit rotation of the second rotor relative to the first rotor in a second direction opposite the first direction over a second angular range.

The rotor-to-rotor relative rotation controlling mechanism includes an elastic member which is engagement at one end thereof with the first rotor and at the other end with the second rotor to urge the first and second rotors in opposite directions.

The stator core is made of a hollow cylindrical member. The first rotor and the second rotor are disposed coaxially with an outer and an inner periphery of the stator core, respectively.

The second rotor is disposed inside the inner periphery of the stator core. The rotor-to-rotor relative rotation controlling mechanism is installed inside the second rotor.

The rotation of the second rotor relative to the first rotor is accomplished by controlling at least one of phase and quantity of current flowing through the armature coils of the stator core.

According to another aspect of the invention, there is provided a multi-rotor synchronous machine which comprises: (a) a pair of rotors at least one of which has permanent magnet field poles, the rotors being arrayed coaxially to be rotatable relative to each other; (b) a stator core; (c) armature coils wound in the stator core, interlining with a field flux produced by the rotors; (d) a sensor measuring a relative angle between the rotors; and (e) a rotor-to-rotor relative angle controller working to establish a relative rotation between the rotors to change the relative angle measured by the sensor to a target angle.

In the preferred mode of the invention, the stator core is made of a hollow cylindrical member. The rotors are an outer rotor disposed around an outer periphery of the stator core and an inner rotor disposed around an inner periphery of the stator core. The rotor-to-rotor relative angel controller includes a relative rotation controlling mechanism disposed inside the inner rotor for controlling a relative rotation between the rotors.

The relative rotation controlling mechanism includes an elastic member laid between the rotors in a circumferential direction thereof to keep the rotors in a neutral position. The rotor-to-rotor relative angle controller changes magnetic torques acting on the rotors to adjust a relative angle between the rotors to a target angle.

The rotor-to-rotor relative angle controller is designed to change the magnetic torque acting on the rotors to rotate one of the rotors relative to the other from the neutral position while compressing or expanding the elastic member, thereby adjusting the relative angle between the rotors to the target angle.

The relative rotation controlling mechanism includes a pair of elastic members secured on one of the rotors to establish the neutral position in which the rotors have a preselected angular relation therebetween when the armature coils is deenergized. The rotor-to-rotor relative angle controller changes the magnetic torques acting on the rotor to cause one of the elastic members to be compressed while expanding the other elastic member, thereby adjusting the relative angle between the rotors to the target angle.

The relative rotation controlling mechanism includes a pair of stoppers working to define a relative rotation allowable range of the rotors.

When the rotors are in a first relative angular position lying one of limits of the relative rotation allowable range defined by one of the stopper, a maximum torque is produced on the rotors in a direction of rotation of the multi-rotor synchronous machine. When the rotors are in a second relative angular position lying the other limit of the relative rotation allowable range defined by the other stopper, a maximum torque is produced on the rotors in a direction reverse to the direction of rotation of the multi-rotor synchronous machine.

One of the rotors has an inertial mass two times greater than that of the other rotor or more.

One of the rotors having the greater inertial mass is coupled to a crankshaft of an automotive engine. The other rotor is coupled to the one of the rotors through the rotor-to-rotor relative angle controller to be rotatable relative to the one of the rotors.

The relative rotation controlling mechanism establishes an engagement between the rotors so as to allow the rotors to rotate relative to each other continuously in a given angular range.

According to the third aspect of the invention, there is provided a drive apparatus for an automotive vehicle which comprises: (a) a flywheel connected to a rear end of a crankshaft of an engine; (b) a generator/motor includes a stator which is located in front of the flywheel and secured to a housing and a rotor which is secured on the flywheel and faces a peripheral surface of the stator; and (c) a mechanical clutch establishing an engagement between the flywheel and an input shaft of a gear reduction unit disposed behind the flywheel, the input shaft extending through the flywheel coaxially with the crankshaft.

The mechanical clutch includes, (a) a pressure plate supported by the flywheel nonrotatably and slidably in an axial direction of the input shaft of the gear reduction unit, the pressure plate facing a rear surface of the flywheel through a given gap, (b) a clutch plate supported by the input shaft nonrotatably and slidably in the axial direction, the clutch plate being disposed between the rear surface of the flywheel and a front surface of the pressure plate, (c) an annular clutch spring located behind the pressure plate, supported by the flywheel so as to urge at an outer periphery thereof a rear end surface of the pressure plate frontward, (d) a sleeve fitted on the input shaft through a given gap between itself and an outer peripheral surface of the input shaft, the sleeve being located behind the clutch plate and secured at a rear end thereof to the housing, (e) a release piston fitted on the outer peripheral surface of the sleeve slidably in an axial direction of the sleeve, and (f) a release bearing fitted on the release piston or the sleeve to be movable in the axial direction to urge an inner peripheral portion of the clutch spring.

The flywheel includes a small-diameter cylinder coupled at a front end thereof to the rear end of the crank shaft and a disc extending from a rear end of the small-diameter cylinder in a centrifugal direction to be engageble with the clutch plate. The clutch plate includes a cylinder which has a chamber opened rearward into which the release bearing is allowed to be inserted at least partially and which is fitted on the input shaft nonrotatably and slidably in the axial direction and a disc extending from a rear end of the cylinder between the rear end surface of the flywheel and the front end surface of the pressure plate. At least a portion of the release piston and the release bearing are located frontward of the clutch spring.

In the preferred mode of the invention, the release bearing is fitted on the release piston.

The clutch plate includes a clutch damper located between the cylinder and the disc thereof for absorbing a variation in torque. A front portion of the clutch damper is disposed within a chamber formed in a rear end portion of the cylinder of the flywheel.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
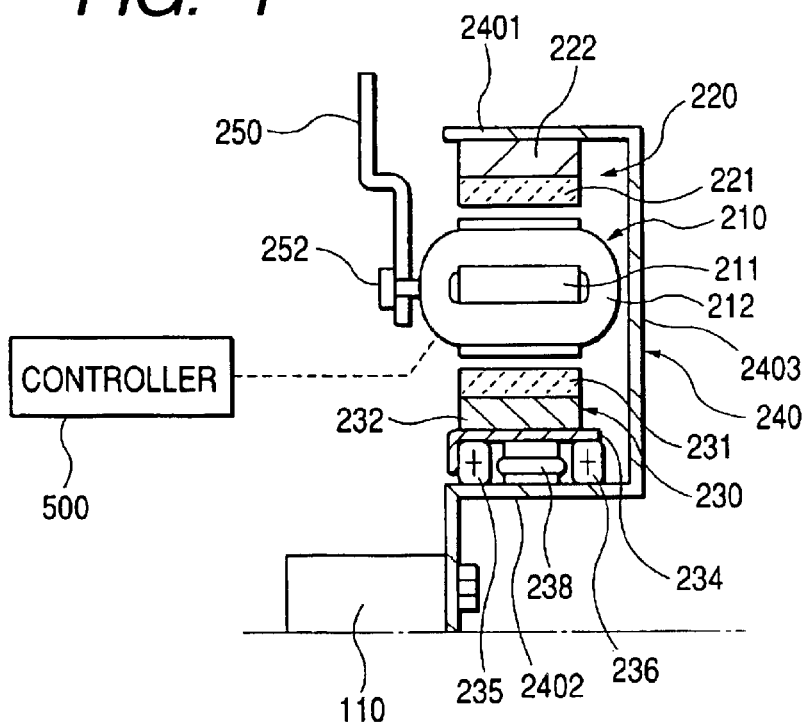
FIG. 1 is a partially sectional view which shows a multi-rotor synchronous machine according to the first embodiment of the invention, as taken along an axial direction thereof.
Figure 2:
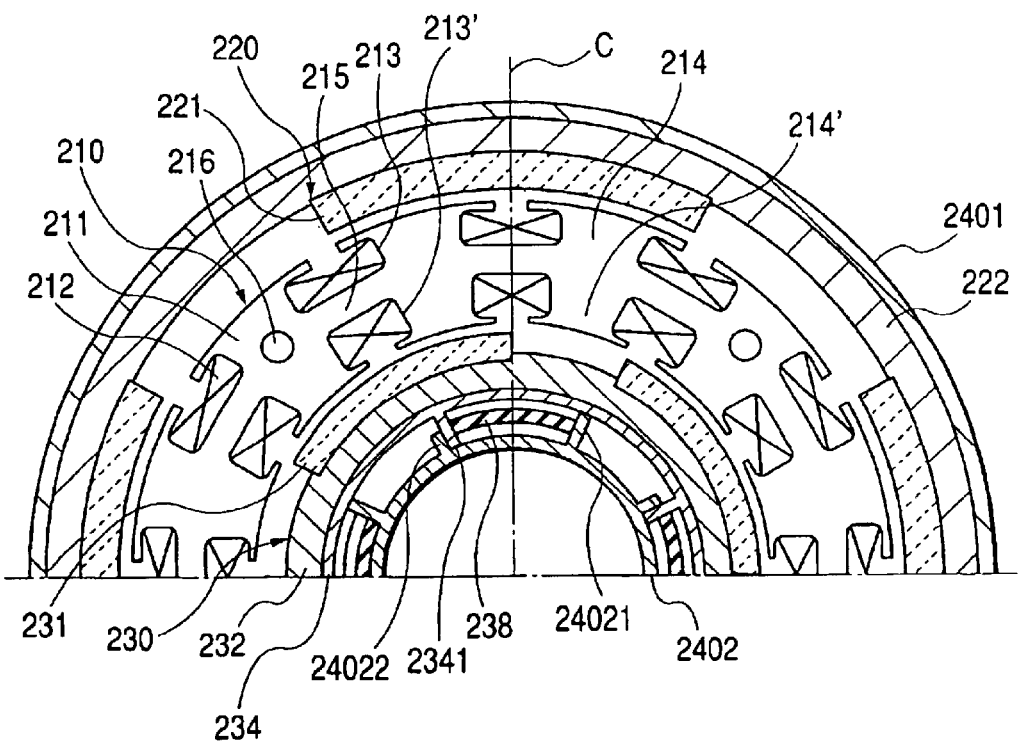
FIG. 2 is a partially sectional view which shows the multi-rotor synchronous machine of FIG. 1, as taken along a broken line C in FIG. 1.

Referring to the drawings, wherein like reference numbers refer to like parts in several views, particularly to FIGS. 1 and 2, there is shown a multi-rotor synchronous machine according to the first embodiment of the invention. The following discussion will refer to an example in which the multi-rotor synchronous machine is used as a dynamo electric machine or generator/motor for automotive vehicles such as hybrid vehicles.

The synchronous machine includes generally a stator 210, an outer rotor 220, an inner rotor 230, a rotor support frame 240, and a stator support frame 250.

The stator 210 consists of a hollow cylindrical stator core 211 disposed within an annular gap between the outer rotor 220 and the inner rotor 230 coaxially therewith and armature coils 212 magnetically coupling with the rotors 220 and 230.

The stator core 211 is made of a lamination of a plurality of magnetic discs laid to overlap each other in an axial direction of the synchronous machine. The stator core 211, as clearly shown in FIG. 2, has outer slots 213 formed in an outer wall thereof at regular intervals in a circumferential direction and inner slots 213' formed in an inner wall thereof in the circumferential direction at regular intervals. Each of the outer slots 213 is, as can be seen in FIG. 2, aligned with one of the inner slots 213' in a radius direction of the stator core 211. In other words, each of the outer slots 213 is provided at the same location in the circumferential direction of the stator core 211 as that of one of the inner slots 213'. A tooth 214 is defined between adjacent two of the outer slots 213. Similarly, a tooth 214' is defined between adjacent two of the inner slots 213'. A core back 215 is defined between the outer slots 213 and the inner slots 213'. The stator core 211 has holes 216 extending through the core back 215 in the axial direction. The stator core 211 is secured on an inner periphery of the stator support frame 250 through bolts 252 screwed into the holes 216. The stator support frame 250 is made of a ring-shaped plate on which an annular step is formed and attached at an outer periphery thereof to a housing (not shown) in front of and outside the stator core 211 in a radius direction of the stator core 211.

The armature coils 212 are made of as many toroidal windings as the outer slots 213 (i.e., the inner slots 213'). Each of the toroidal windings is formed by a conductor wound through one of the outer slots 213 and a corresponding one of the inner slots 213' which are arrayed at the same angular position in the circumferential direction of the stator core 211. Leading and trailing ends of each of the toroidal windings extend outside the front end of the stator core 211. The leading and trailing ends of the toroidal windings are broken into three groups and connected in the respective groups to provide three-phase windings: a U-phase winding, a V-phase winding, and a W-phase winding. In this embodiment, the U-phase winding is wound through nth pairs of the slots 213 and 213' in the circumferential direction of the stator core 211. The V-phase winding is wound through (n+1)th pairs of the slots 213 and 213'. The W-phase winding is wound through (n+2)th pairs of the slots 213 and 213'. The armature coils 212 are connected electrically to a controller 500. The controller 500 works to control the phase and quantity of current flowing through the armature coils 212.

The outer rotor 220 and the inner rotor 230 are each made of a hollow cylindrical member. The inner peripheral surface of the outer rotor 220 is magnetically coupled with an outer peripheral surface of the inner rotor 230 through a small magnetic gap. The outer rotor 220 includes a soft iron-made hollow cylinder 222 and permanent magnets 221 each made of a magnetic plate curved along the circumference of the hollow cylinder 222. The permanent magnets 221 are arrayed on the inner wall of the hollow cylinder 222 at regular intervals in the circumferential direction thereof. Similarly, the inner rotor 230 includes a soft iron-made hollow cylinder 232 and permanent magnets 231 each made of a magnetic plate curved along the circumference of the hollow cylinder 232. The permanent magnets 231 are arrayed on the outer wall of the hollow cylinder 232 at regular intervals in the circumferential direction thereof. The permanent magnets 221 are magnetized in the radius direction of the hollow cylinder 222 and so arranged that different field poles, i.e., N-poles and S-poles are arrayed alternately in the circumferential direction of the hollow cylinder 222. Similarly, the permanent magnets 231 are magnetized in the radius direction of the hollow cylinder 232 and so arranged that N-poles and S-poles are arrayed alternately in the circumferential direction of the hollow cylinder 232.

The rotor support frame 240 includes an outer hollow cylinder 2401, an inner hollow cylinder 2402, and an annular disc 2403. The outer hollow cylinder 2401 retains the outer periphery of the outer rotor 220. The inner hollow cylinder 2402 supports the inner surface of the inner rotor 230 rotatably in the circumferential direction thereof. The annular disc 2403 connects rear ends of the outer hollow cylinder 2401 and the inner hollow cylinder 2401 together.

The inner hollow cylinder 2402 is coupled at a front end thereof to a rear end of a crankshaft 110 of the engine (not shown). The annular disc 2403 is coupled at a rear end thereof to a transmission (not shown) through a clutch mechanism (not shown). An example of the connection of the multi-rotor synchronous machine with the engine and the transmission will be described in detail later with reference to FIGS. 38 and 39.

A support structure for the inner rotor 230 will be described below.

A hollow cylinder 234 serving as an inner rotor support stay is press fit in the inner rotor 230. The hollow cylinder 234 has formed on an inner wall thereof at regular intervals in a circumferential direction a plurality of protrusions or ribs 2341 each extending in a radius direction. A pair of ball bearings 235 and 236 is mounted on the inner cylinder 2402 of the rotor support frame 240. The inner cylinder 2402 has formed on an outer wall thereof in a circumferential direction higher and lower ribs 24021 and 24022 which extend in a radius direction of the inner cylinder 2402 and are arrayed alternately at regular intervals in the circumferential direction thereof. An arc-shaped elastic member 238 such as rubber is installed between each of the ribs 2341 and one of the ribs 24021 located adjacent that rib 2341 in a clockwise direction as viewed in FIG. 2.

Specifically, the inner rotor support stay 234 and the inner rotor 230 secured on the inner rotor support stay 234 are so constructed as to be rotatable relative to the outer rotor 220 within a range of an angular position where each of the ribs 2341 is in contact with one of the ribs 2341 to an angular position where the torque acting on the rib 2341 is balanced with the elastic pressure produced by one of the elastic members 238.

Each of the elastic members 238 is in contact at a left end, as viewed in FIG. 2, with one of the ribs 2341 and at a right end with one of the ribs 24021 to urge the rib 2341 against a corresponding one of the ribs 24022 in a counterclockwise direction.

In operation, the location of the field pole of the outer rotor 220 is monitored to determine the phase and frequency of a three-phase alternating voltage to be applied to the armature coils 212 for producing the torque. This operation is the same as that of typical permanent magnet field pole synchronous machines, and explanation thereof in more detail will be omitted there.

Figure 3:
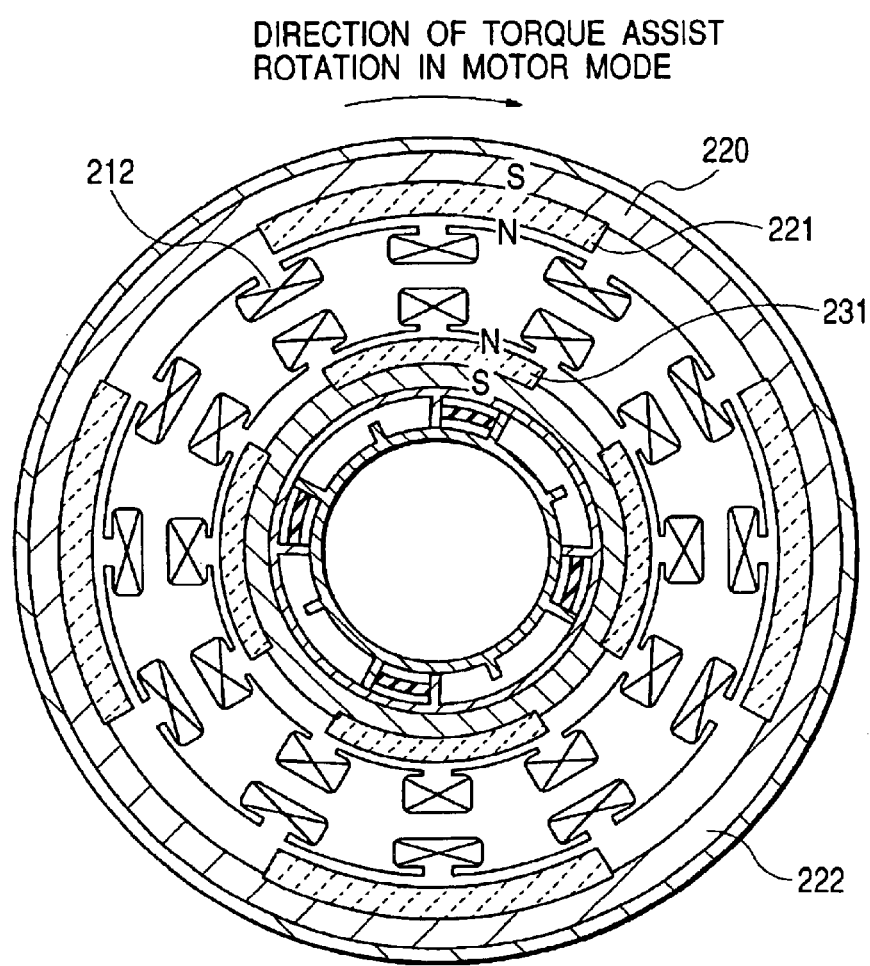
FIG. 3 is a partially sectional view which shows the multi-rotor synchronous machine of FIG. 1 when used as a torque assist motor for automotive vehicles.

The adjustment of an angular position of the inner rotor 230 relative to the outer rotor 220 will be described below with reference to FIGS. 2 and 3, taking an example wherein the multi-rotor synchronous machine is operated in a motor mode (i.e., a torque assist mode usually used in hybrid vehicles). It the following discussion, it is assumed that when the ribs 2341 of the inner rotor support stay 234 are in the leftmost angular position in the counterclockwise direction, as illustrated in FIG. 2, that is, when the inner rotor 230 is shifted relative to the outer rotor 220 and lies at a counterclockwise angular limit, the elastic members 238 work to urge the inner rotor 230 elastically in the counterclockwise direction at a minimum elastic pressure. FIG. 3 illustrates the inner rotor 30 which is shifted relative to the outer rotor 220 in the clockwise direction to the rightmost angular position and lies at a clockwise angular limit.

In the angular position of FIG. 2, the inner rotor 230 is urged by the elastic members 238 in the counterclockwise direction and held at the counterclockwise angular limit. Specifically, the ribs 2341 of the inner rotor support stay 234 are pressed by the elastic members 238 into constant engagement with the ribs 24022 of the inner cylinder 2402. If the electromagnetic force produced in the motor mode acting on the inner rotor 230 in the clockwise direction is less than a lower limit of the elastic pressure provided by the elastic members 238, the inner rotor 230 are held at the illustrated angular position.

Figure 4:
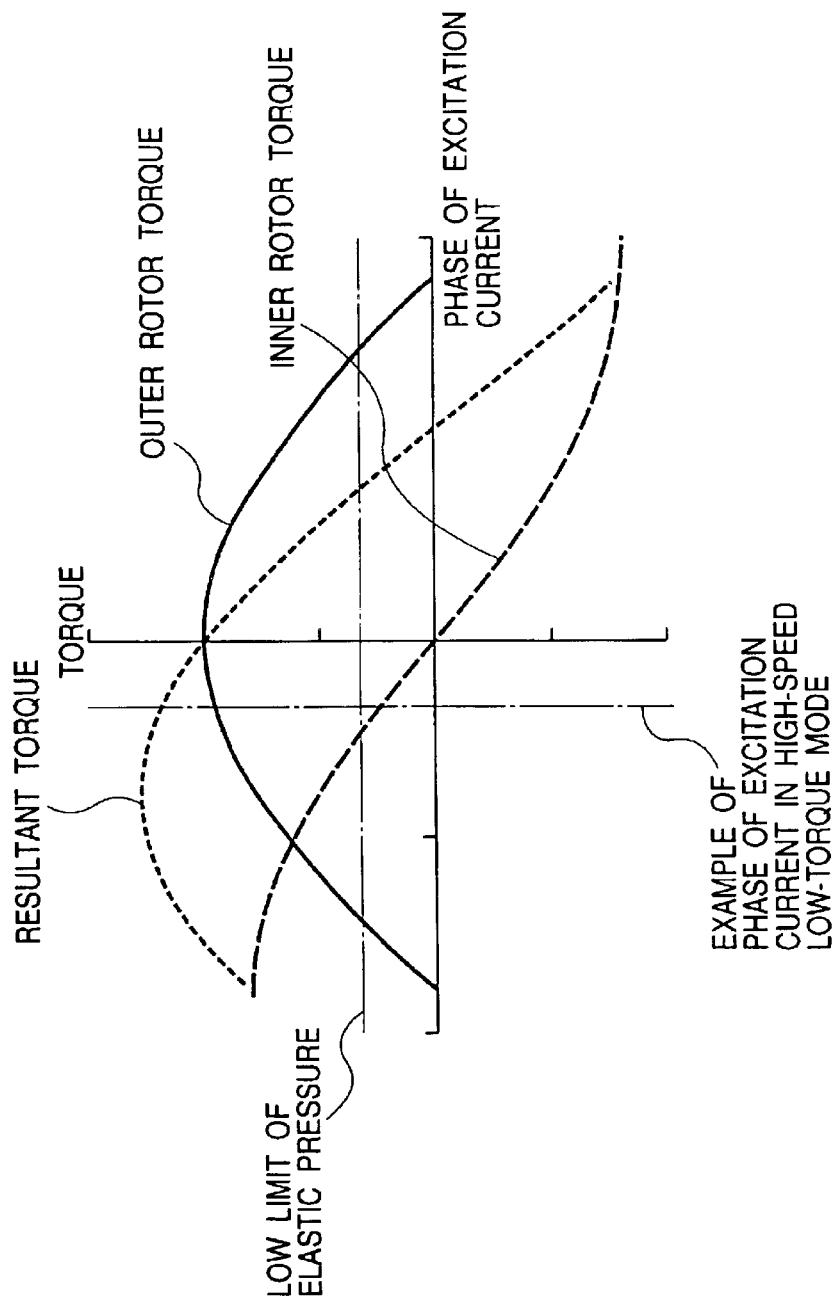
FIG. 4 is a graph which shows the relation between the phase of current flowing through armature coils and torques acting on outer and inner rotors.

The setting of the electromagnetic force acting on the inner rotor 230 to the lower limit of the elastic pressure provided by the elastic members 238 or less is accomplished by adjusting either or both of the quantity and phase of current flowing through the armature coils 212 using the controller 500. The magnitude of the electromagnetic forces acting on the outer and inner rotors 220 and 230 depend upon the phase and quantity of current flowing through the armature coils 212. Accordingly, when there is the angular difference, as shown in FIG. 2, between the outer rotor 220 and the inner rotor 230, the sum of the motor torques produced by the outer and inner rotors 220 and 230, i.e., the resultant output torque will be small. Specifically, the quantity of resultant field magnetic flux interlinking with the armature coils 212 is small, so that the counter electromotive force produced in the armature coils 212 during rotation of the synchronous machine at high speeds will be low. FIG. 4 represents an example of torque characteristics when a greater angular difference is established between the outer rotor 220 and the inner rotor 230. Note that the electromagnetic force acting on the inner rotor 230 is outputted through the elastic members 238.

As the electromagnetic force acting on the inner rotor 230 (i.e., the electromagnetic force oriented in the clockwise direction) increases, a balance point at which the electromagnetic force balances with the elastic pressure of the elastic members 238 is shifted in the clockwise direction, as viewed in FIG. 2, thereby causing the angular position of the inner rotor 230 relative to the outer rotor 220 to be shifted in the clockwise direction. The increasing of the electromagnetic force acting on the inner rotor 230 is accomplished by increasing the quantity of current flowing through the armature coils 212 and/or controlling the phase thereof. The clockwise rotation of the inner rotor 230 relative to the outer rotor 220 causes the phase difference between vectors of torques of the outer and inner rotors 220 and 230 to decrease, thus resulting in an increase in resultant motor torque.

Figure 5:
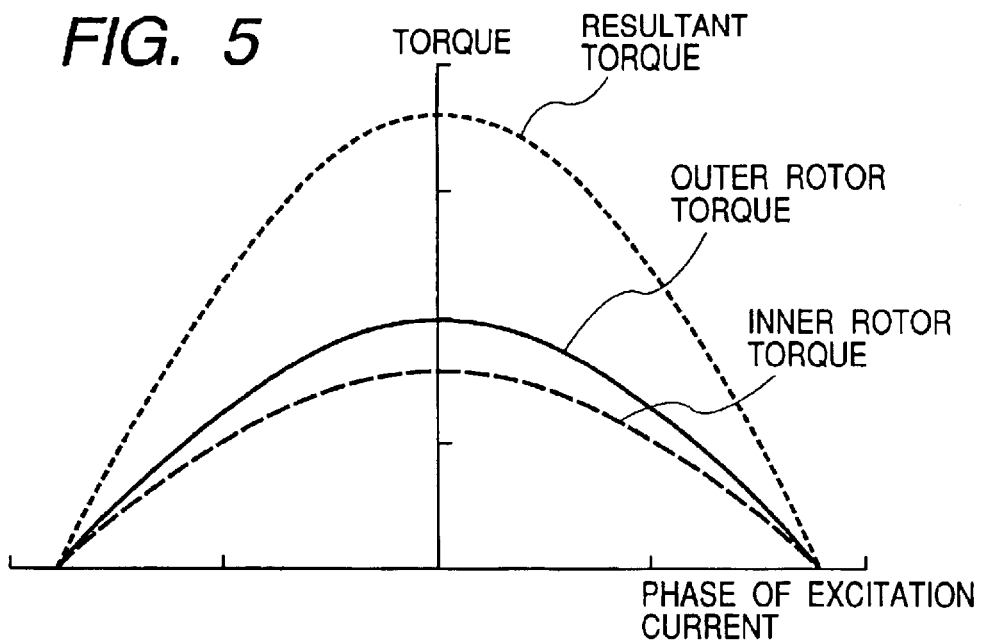
FIG. 5 is a graph which represents the relation between the phase of current supplied to armature coils and an output torque when an angular difference between outer and inner rotors is near zero.

A more increase in electromagnetic force acting on the inner rotor 230 in the clockwise direction causes the balance point of the electromagnetic force and the elastic pressure developed by the elastic members 238 to be shifted in the clockwise direction further, so that the inner rotor 230 moves relative to the outer rotor 220 toward the clockwise angular limit (i.e., the rightmost angular position in FIG. 2). When the inner rotor 230 reaches the clockwise angular limit, as shown in FIG. 3, and the electromagnetic force acting on the inner rotor 230 exceeds an upper limit of the elastic pressure developed by the elastic members 238, it will cause the inner rotor 230 to be held at the angular position as illustrated in FIG. 3. In this position, a near zero angular difference is established between the permanent magnets 221 and 231 of the outer rotor 220 and the inner rotor 230, so that a great field magnetic flux acts on the armature coils 212, thereby allowing a greater motor torque to be outputted. FIG. 5 represents a torque characteristic when the angular difference between the outer rotor 220 and the inner rotor 230 is almost zero. The shift of the inner rotor 230 from the angular position of FIG. 3 to that of FIG. 2 is accomplished by decreasing the quantity of current flowing through the armature coils 212 and controlling the phase thereof in a manner reverse to that as described above to decrease the electromagnetic force acting on the inner rotor 230.

Figure 6:
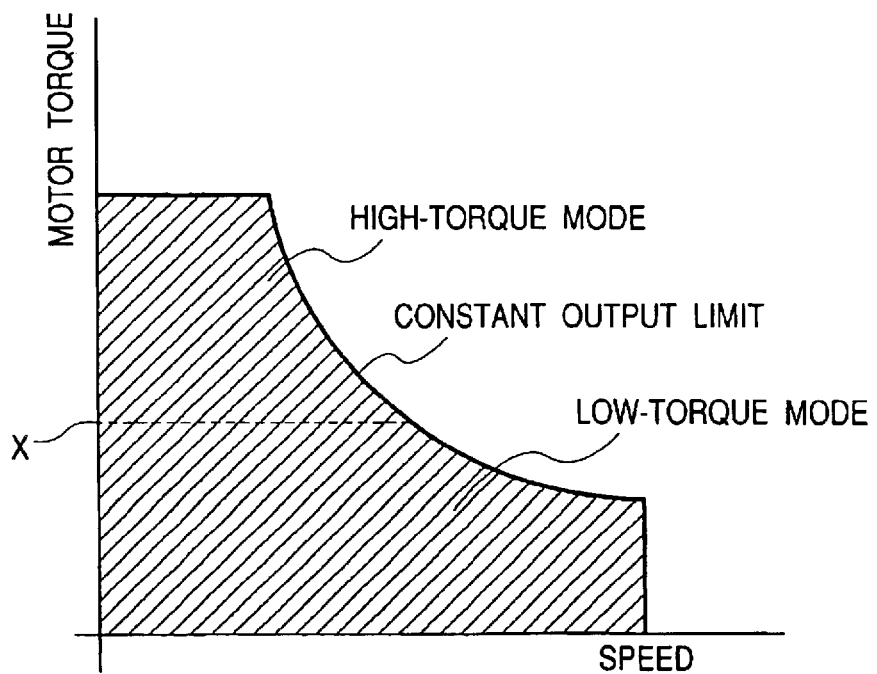
FIG. 6 is a graph which represents the switching between a low-torque mode as shown in FIG. 2 and a high-torque mode as shown in FIG. 3 across a point where electromagnetic force is balanced with elastic pressure.

As apparent from the above discussion, when the electromagnetic force produced in the motor mode acting on the inner rotor 230 is less than the lower limit of the elastic pressure produced by the elastic members 238 or when the electromagnetic force is produced in the counterclockwise direction, as viewed in FIG. 2, in the generator mode, the inner rotor 230 is held at the angular position as illustrated in FIG. 2. When the electromagnetic force acting on the inner rotor 230 is equal to the elastic pressure produced by the elastic members 238, the inner rotor 230 is held intermediate between the angular positions in FIGS. 2 and 3. When the electromagnetic force acting on the inner rotor 230 is greater than the upper limit of the elastic pressure produced by the elastic members 238, the inner rotor 230 is held at the angular position as illustrated in FIG. 3. Therefore, when it is required for the synchronous machine to produce a greater torque at low speeds, for example, in a start-up mode of engine operation, the synchronous machine is preferably operated with the inner rotor 230 held at the angular position as illustrated in FIG. 3. When it is required to run the synchronous machine at high speeds, the inner rotor 230 is preferably held at the angular position as illustrated in FIG. 2, thereby decreasing the counterelectromotive force produced in the armature coils 212. FIG. 6 shows an example of an output torque control mode in which when a required motor torque exceeds a threshold level X, the inner rotor 230 is switched from the angular position as illustrated in FIG. 2 to that as illustrated in FIG. 3. The inner rotor 230 may also be held at the intermediate angular position as a function of the magnitude of the required motor torque.

Specifically, the inner rotor 230 is retained to be rotatable relative to the outer rotor 220. The inner rotor 220, thus, produces the torque varying as a function of an angular position relative to the outer rotor 220.

As apparent from the above discussion, in a case where the multi-rotor synchronous machine is used as an automotive generator/motor, when it is required to use the generator/motor for assisting in outputting the drive torque, the reduction in counterelectromotive force induced in the armature coils 212 may be achieved by adjusting the magnitude or phase of current to be supplied to the armature coils 212. If a failure in control of an inverter occurs when the automotive vehicle is running at high speeds, a great voltage is not developed at the armature coils 212, thus improving the safety of a power source system. Specifically, when the automotive vehicle is running at high speeds, the inner rotor 230 is held at the angular position as illustrated in FIG. 2. Thus, if the failure in control of the inverter occurs, the resultant field magnetic flux interlinking with the armature coils 212 is kept small, thereby keeping induced open electromotive voltage at a lower level.

Figure 7:
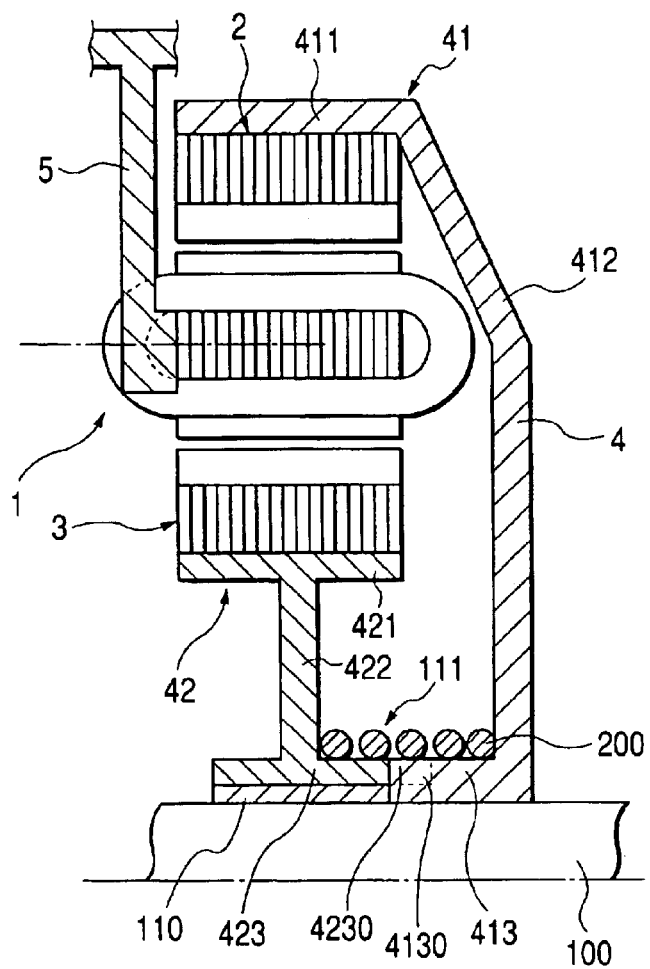
FIG. 7 is a partially sectional view which shows a modification of a multi-rotor synchronous machine of the first embodiment.

FIG. 7 shows a modification of the multi-rotor synchronous machine of the first embodiment which may be employed as a drive generator/motor installed in a fuel cell-powered vehicle.

The multi-rotor synchronous machine includes a stator 1, an outer rotor 2, an inner rotor 3, a rotor support frame 4, and a stator support frame 5. The stator 1 and the outer and inner rotors 2 and 3 are identical in structure with the stator 210 and the outer and inner rotors 220 and 230 in the first embodiment.

The rotor support frame 4 includes a first plate 41 on which an outer periphery of the outer rotor 2 is mounted and a second plate 42 on which an inner periphery of the inner rotor 3 is mounted. The first plate 41 is made up of an outer hollow cylinder 411 on which the outer periphery of the outer rotor 2 is secured, a disc 412, and an inner hollow cylinder 413 fitted on a rotary shaft 100 nonrotatably. The second plate 42 is made up of an outer hollow cylinder 421 on which the inner periphery of the inner rotor 2 is secured, a disc 422, and an inner hollow cylinder 423 fitted rotatably on the rotary shaft 100 through a bearing metal 110.

A spring housing 111 is defined around a rear half of the inner hollow cylinder 423 and the inner hollow cylinder 413. A coil spring 200 is disposed in the spring housing 111 and coupled at an end thereof to the inner hollow cylinder 413 to urge the inner hollow cylinder 423 in the counterclockwise direction like the first embodiment.

The inner hollow cylinder 413 has a groove 4130 formed in a front end thereof over a given angular range. The inner hollow cylinder 423 has formed on a rear end thereof a protrusion 4230 which extends into the groove 4130. The protrusion 4230 is slidable in the groove 4130 within a given angular range defined by contacts with ends of the groove 4130 in a lengthwise direction thereof. This allows the inner rotor 3 to rotate relative to the outer rotor 2 within the given angular range. The inner rotor 3 is, as described above, urged elastically by the coil spring 200 in the counterclockwise direction as viewed from the front side thereof, thereby producing the same effects as in the first embodiment.

Figure 8:
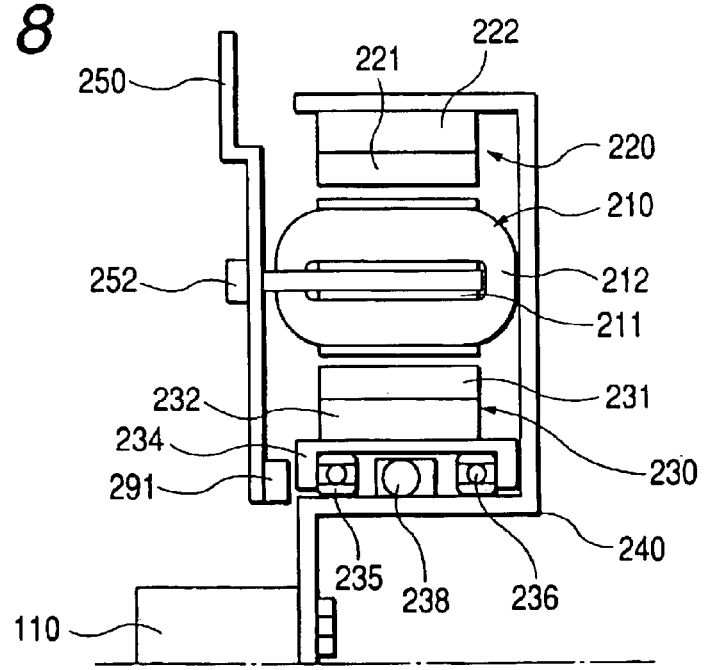
FIG. 8 is a partially sectional view which shows a multi-rotor synchronous machine according to the second embodiment of the invention, as taken along an axial direction thereof.
Figure 9:
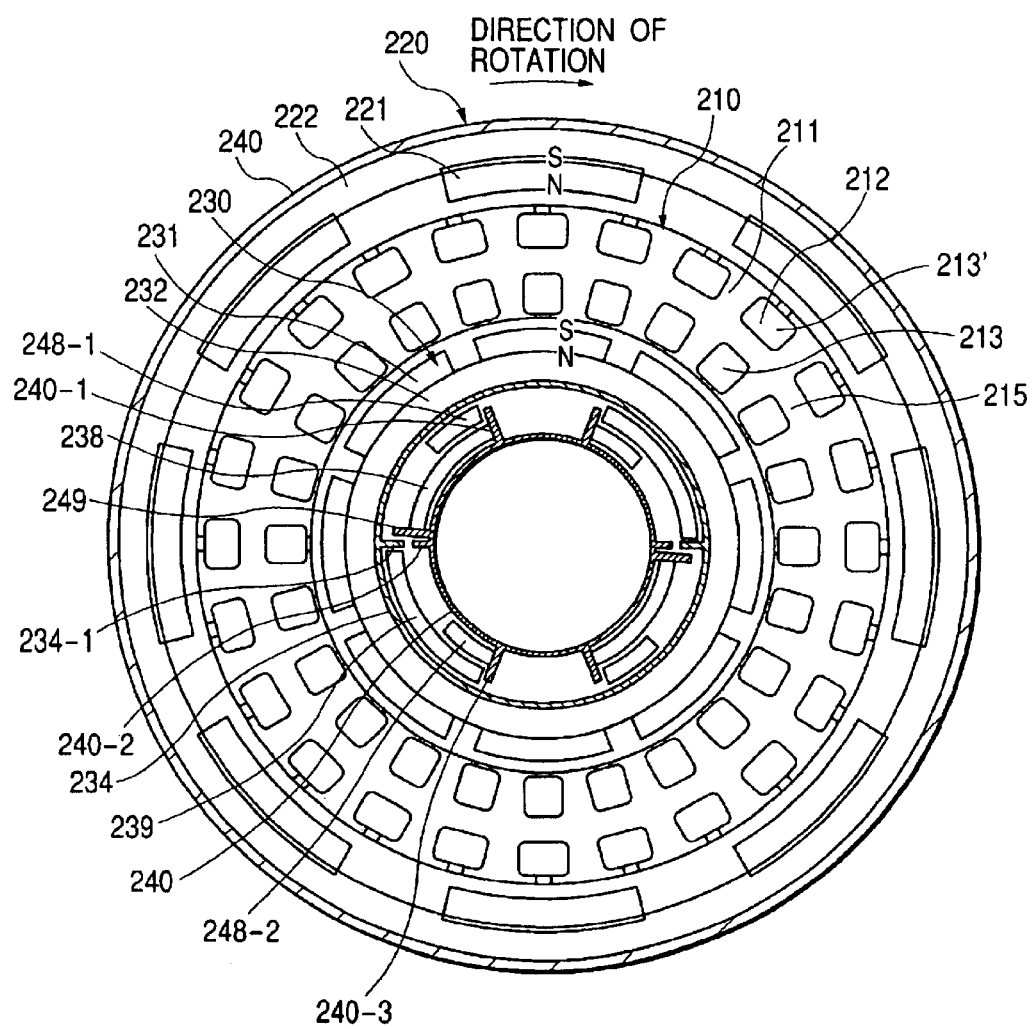
FIG. 9 is a partially sectional view which shows the multi-rotor synchronous machine of FIG. 8, as taken along a radius direction thereof.

FIGS. 8 and 9 show a multi-rotor synchronous machine according to the second embodiment of the invention. The same reference numbers as employed in the first embodiment refer to the same parts, and explanation thereof in detail will be omitted here.

Stator windings 212 (i.e., armature coils) are arrayed in a magnetic core 211 of a stator 210. Specifically, each stator winding 212 consists of a conductor shaped to form a number of loops or turns each of which extends from a front surface of the magnetic core 211 into one of slots 213' perpendicular to the drawing of FIG. 9 (i.e., a direction of lamination of magnetic discs making up the magnetic core 211), passes over a back surface of a core back 215, enters one of slots 213, and returns back to a front surface of the magnetic core 211. The stator windings 212 arrayed at a three-slot interval away from each other are coupled to form one of three-phase windings.

The multi-rotor synchronous machine also includes, as shown in FIG. 9, an outer rotor 220 and an inner rotor 230. Magnets 221 and 231 forming field poles are secured on rotor yokes 222 and 232. A rotor support stay 240 is connected to a crankshaft 110 of the engine. The magnetic core 211 is installed on a stator support stay 250 through a pin 252. The stay 250 is connected to an engine frame or transmission (not shown).

A inner rotor support stay 234 which retains the inner rotor 230 is carried by bearings 235 and 236 to be slidable along the rotor support stay 240. An angle sensor 291 is installed on a back surface of an end of the stator support stay 250 and monitors an angular position of the inner rotor 230 relative to the outer rotor 220 to provide a signal indicative thereof. A pair of angle sensors may alternatively be installed on the stator support stay 250 to measure the angular positions of the outer and inner rotors 220 and 230 independently.

First elastic members 238 such as springs or rubber are disposed around the inside periphery of the rotor support stay 240. Each of the first elastic members 238 is secured at one end thereof to one of protrusions or ribs 240-1 formed on the inside periphery of the rotor support stay 240 and urges at the other end thereof one of spacers 249 elastically in the counterclockwise direction, as viewed in FIG. 9. This causes each of the spacers 249 to be urged, as clearly shown in FIG. 10, into constant engagement with one of protrusions or ribs 240-2 formed on the inside periphery of the rotor support stay 240.

Second elastic members 239 such as springs or rubber are disposed around the inside periphery of the rotor support stay 240. Each of the second elastic members 239 is secured at one end thereof to one of protrusions or ribs 240-3 formed on the inside periphery of the rotor support stay 240 and urges, as clearly shown in FIG. 10, at the other end thereof one of protrusions or ribs 234-1 formed on an inner periphery of the inner rotor support stay 234 in the clockwise direction as viewed in FIG. 9, so that the rib 234-1 elastically urges the spacer 249 against the elastic pressure produced by the first elastic member 238.

Stoppers 248-1 are each secured at one end thereof on the ribs 240-1 of the rotor support stay 240. When the inner rotor support stay 234 is rotated in the clockwise direction, as viewed in FIG. 9, the rib 234-1 is brought into engagement with the other end of one of the stoppers 248-1, thereby defining a maximum clockwise angle of the inner rotor support stay 234.

Similarly, stoppers 248-2 are each secured at one end thereof on the ribs 240-3 of the rotor support stay 240. When the inner rotor support stay 234 is rotated in the counterclockwise direction, as viewed in FIG. 9, the rib 234-1 is brought into engagement with the other end of one of the stoppers 248-1, thereby defining a maximum counterclockwise angle of the inner rotor support stay 234.

Figure 10:
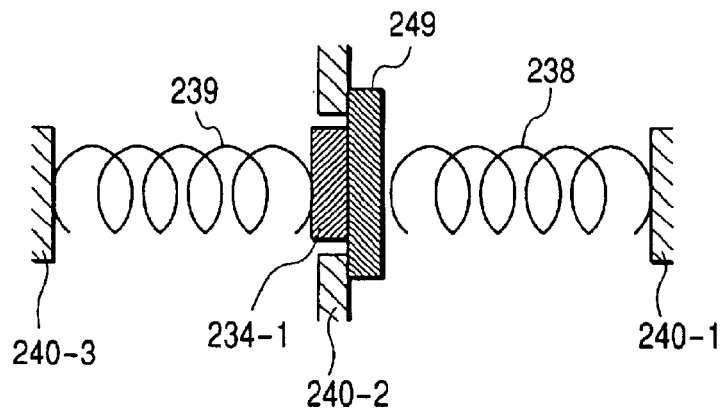
FIG. 10 is a partially enlarged view which shows arrangements of elastic members and ribs of a rotor support stay and an inner rotor support stay.

Specifically, each of the ribs 234-1 of the inner rotor support stay 234 is, as can be seen from FIG. 10, urged elastically by one of the first elastic members 238 in the counterclockwise direction and one of the second elastic members 239 in the clockwise direction, so that it may be movable between the stoppers 248-1 and 248-2 relative to the rotor support stay 240.

Figure 11:
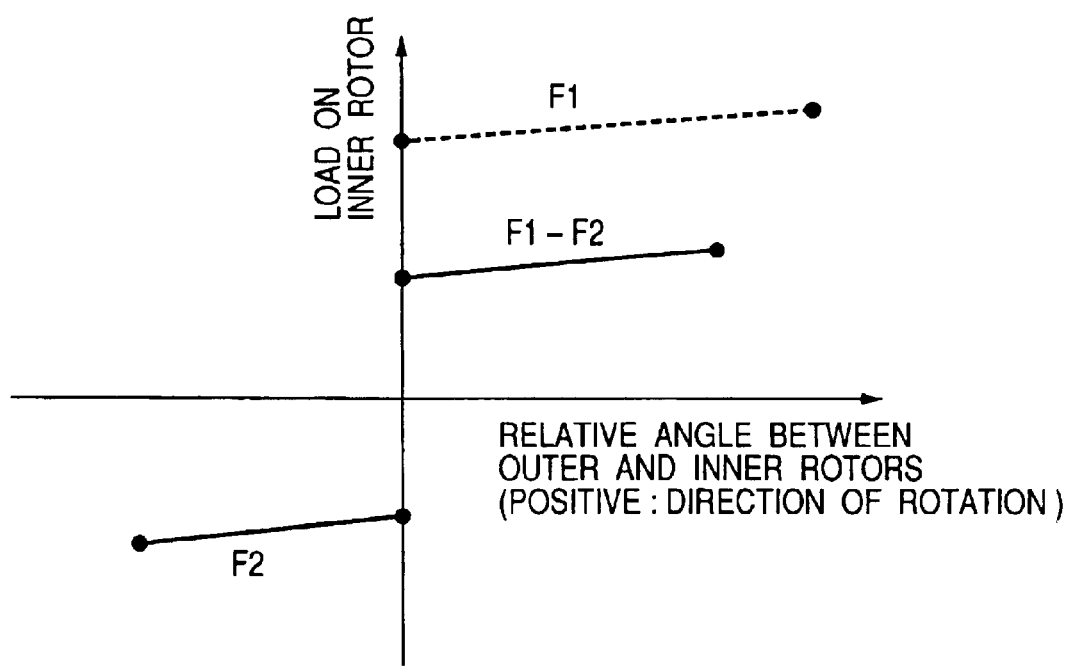
FIG. 11 is a graph which shows the relation between loads acting on an inner rotor and relative angle between the inner and outer rotors.

The relation between the angular position of each of the ribs 234-1 of the inner rotor support stay 234 relative to the rotor support stay 240 (i.e., the relative angle between the outer and inner rotors 220 and 230) and a load F1 produced by one of the first elastic member 238 and a load F2 produced by one of the second elastic members 239 acting on a corresponding one of the ribs 234-1 is shown in FIGS. 10 and 11.

The operation of the multi-rotor synchronous machine of this embodiment will be described below. It is assumed that when the multi-rotor synchronous machine is in an off-state, that is, when the armature coils 212 are deenergized, the circumferential center of each of the magnets 221 of the outer rotor 220 substantially coincides, as shown in FIG. 9, with that of a corresponding one of the magnets 231 of the inner rotor 230 in a radius direction, and different polarities of the magnets 221 and 231 are opposed to each other.

Figure 12:
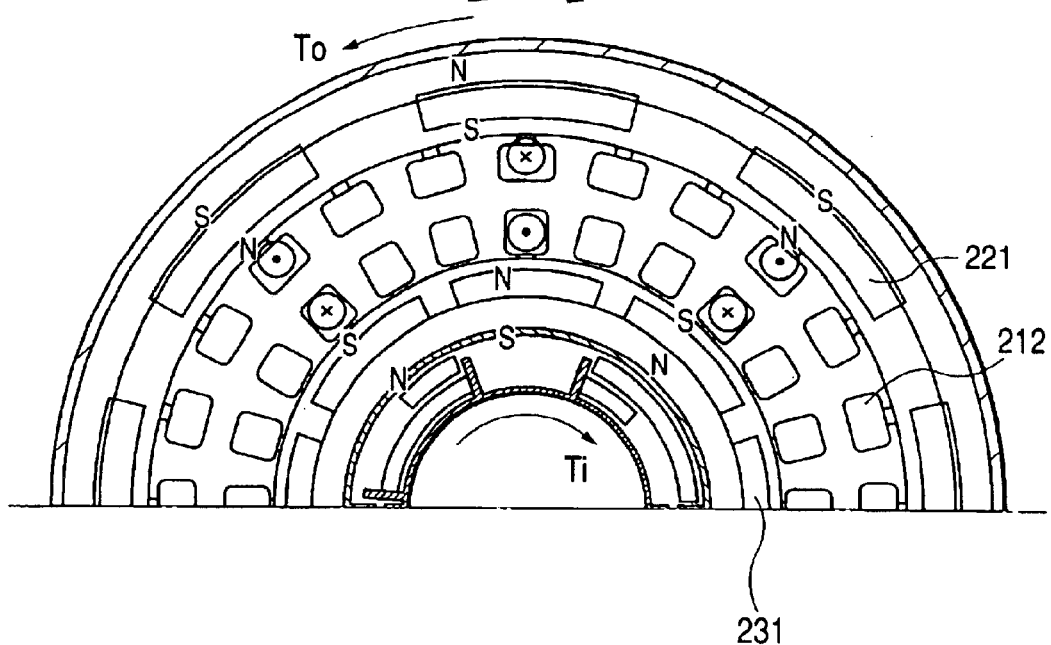
FIG. 12 is a partially sectional view which shows the phase of current flowing through armature coils which is controlled when it is required to change the relative angle between outer and inner rotors from that in a neutral position in the second embodiment.
Figure 13:
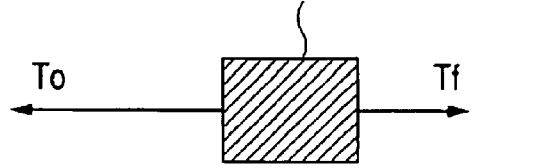
FIG. 13 is an illustration which shows torques acting on outer and inner rotors when the phase of current flowing through armature coils is controlled as shown in FIG. 12.
Figure 13:
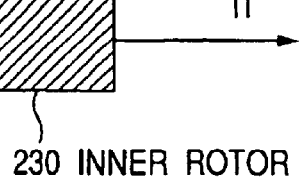

FIG. 12 shows a neutral position of the multi-rotor synchronous machine. In this position, the magnets 221 of the outer rotor 220 are shifted an electrical angle of $\pi$ from the magnets. 231 of the inner rotor 230, so that the armature coils 212 interlink with a resultant magnetic flux that corresponds to a difference between magnetic fluxes of the magnets 221 and 231.

When the armature coils 212 are energized with the current of phase as illustrated in FIG. 12, it will cause magnetic torque To to act on the outer rotor 220 and magnetic torque Ti to act on the inner rotor 230. The magnetic torques To and Ti are oriented in opposite directions.

Figure 14:
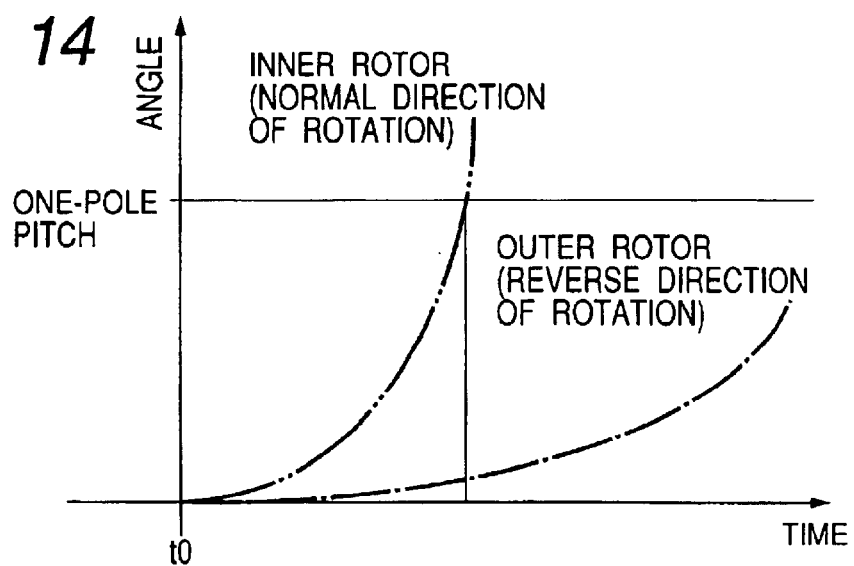
FIG. 14 is a graph which shows the relation between torques acting on outer and inner rotors when the phase of current flowing through armature coils is controlled as shown in FIG. 12.

Specifically, if an elastic load (e.g., a spring load) produced by the elastic members 238 and an elastic load produced by the elastic members 239 are defined as F1 and F2, respectively, torque Tf produced by a difference |F1−F2| opposed to the magnetic force oriented in the normal direction of rotation of the synchronous machine acts on the inner rotor 230. Additionally, torque Tr produced by the elastic load F2 opposed to the magnetic force oriented in the reverse direction of rotation acts on the inner rotor 230. Assuming that the torque To is greater than the torque Ti as a function of a difference in quantity of magnetic flux between the magnets 221 and 231, the torque Ti is greater than the torque Tf, and the torque Tf is substantially equal to the torque Tr, these torques work to rotate the outer and inner rotors 220 and 230 at angular accelerations of βo and βi from a start time t0 when the armature coils 212 start to be energized. Time-sequential changes in angular position of the outer and inner rotors 220 and 230 are illustrated in FIG. 14. If the inertial mass of the outer rotor 220 and the inertial mass of the inner rotor 230 are defined as Io and Ii, respectively, relations between the torques and accelerations acting on the outer and inner rotors 220 and 230 may be expressed as $$To-Tf=Io\cdot \beta o$$

$$Ti-Tf=Ii\cdot \beta i$$

Since the inertial mass Io of the outer rotor 220 is much greater, preferably two times greater than the inertial mass Ii of the inner rotor 230 or more, the inner rotor 230 starts, as can be seen from FIG. 14, to rotate more quickly than the outer rotor 220.

Figure 15:
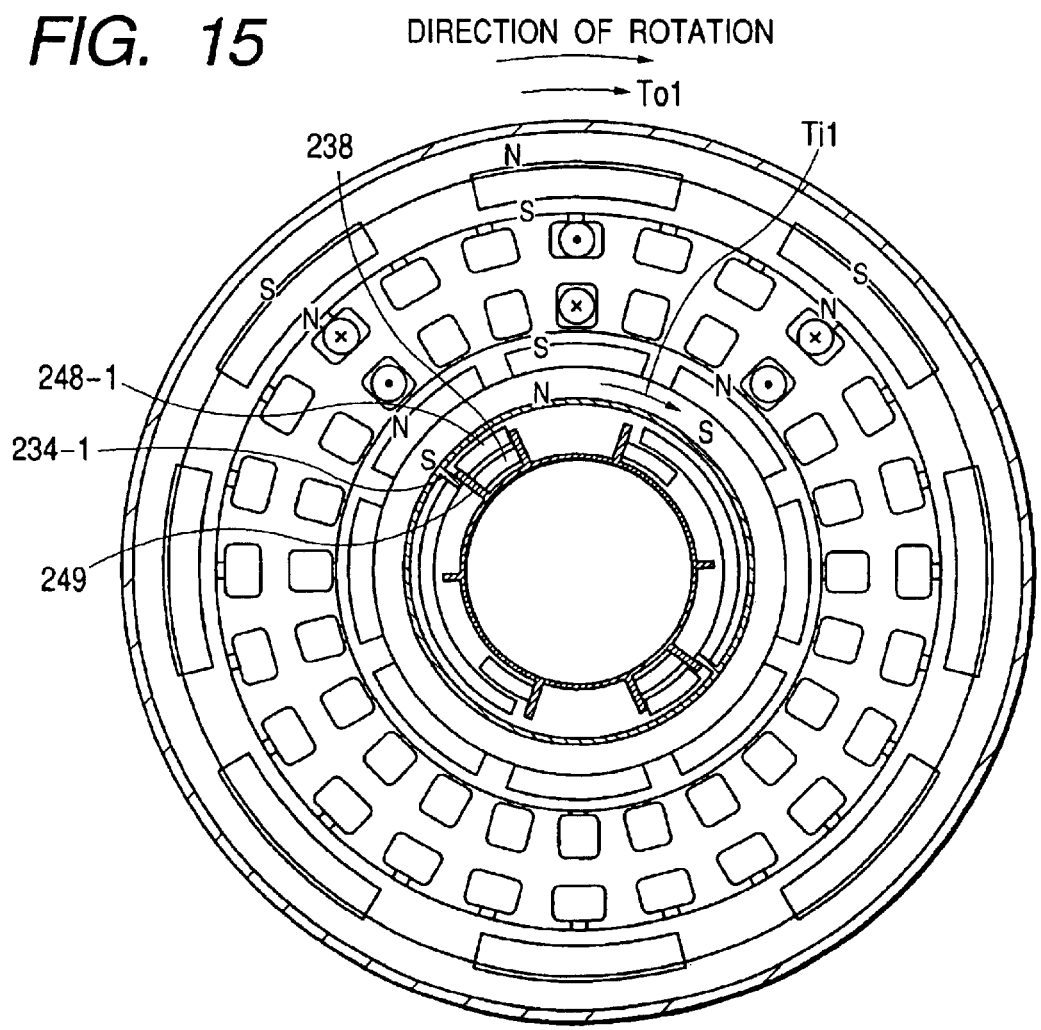
FIG. 15 is a sectional view which shows the phase of current flowing through armature coils controlled in a low-speed and high torque motor mode in the second embodiment.

When the current is applied to the armature coils 212, and the phase thereof is so controlled as to induce the magnets 231 of the inner rotor 230 to produce a maximum motor torque to rotate the outer and inner rotors 220 and 230 in the normal direction of rotation from the angular position as illustrated in FIG. 12, the magnetic torques oriented to the reverse direction of rotation (i.e., the counterclockwise direction in FIG. 12) are first exerted on the outer and inner rotors 220 and 230 for a short period of time. This causes the outer rotor 220 to rotate in the counterclockwise direction, however, an angular shift of the outer rotor 220 immediately after the start-up is small because the inertial mass of the outer rotor 220 is greater (see FIG. 14). The inertial mass of the inner rotor 230 is smaller, so that the inner rotor 230 starts to rotate quickly in the normal direction (i.e., the clockwise direction in FIG. 12) the short period of time after the start-up. This causes the outer and inner rotors 220 and 230 to have a relative angle, as shown in FIG. 15, therebetween. In this position, each of the ribs 234-1 of the inner stator support stay 234, as shown in FIG. 15, compresses one of the first elastic members 238 through the spacer 249 against the elastic load of |F1−F2| and is held at an angular position defined by the stopper 248-1.

Figure 16:
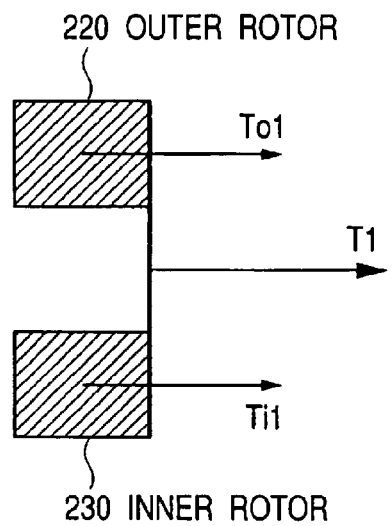
FIG. 16 is an illustration which shows torques acting on outer and inner rotors when the phase of current flowing through armature coils is controlled as shown in FIG. 15.

In the angular position as illustrated in FIG. 15, when the current is applied to the armature coils 212 with the illustrated phase, the magnets 221 and 231 of the outer and inner rotors 220 and 230 produce maximum magnetic torques in the clockwise direction. Specifically, the torques To1 and Ti1, as shown in FIG. 16, acting on the outer and inner rotors 220 and 230 are oriented in the same direction, thereby resulting in production of a great resultant torque T1=To1+Ti1 in a direction in which the multi-rotor synchronous machine is to be rotated. This motor mode of operation is, thus, suitable for assisting in producing a higher output torque when the engine is started or accelerated.

After completion of the start-up or acceleration of the engine, the quantity of current to be supplied to the armature coils 212 is decreased to reduce the torques acting on the outer and inner rotors 220 and 230 as a function of a required output torque of the synchronous machine. When the torque Ti2 acting on the inner rotor 230 drops below the elastically produced torque Tf, it will cause the inner rotor 230 to rotate relative to the outer rotor 220, so that it returns back to the angular position as illustrated in FIG. 12. The resultant magnetic flux interlinking with the armature coils 212, thus, decreases greatly, thereby causing the counterelectromotive force produced in the armature coils 212 during rotation of the synchronous machine at high speeds to be lowered.

Figure 17:
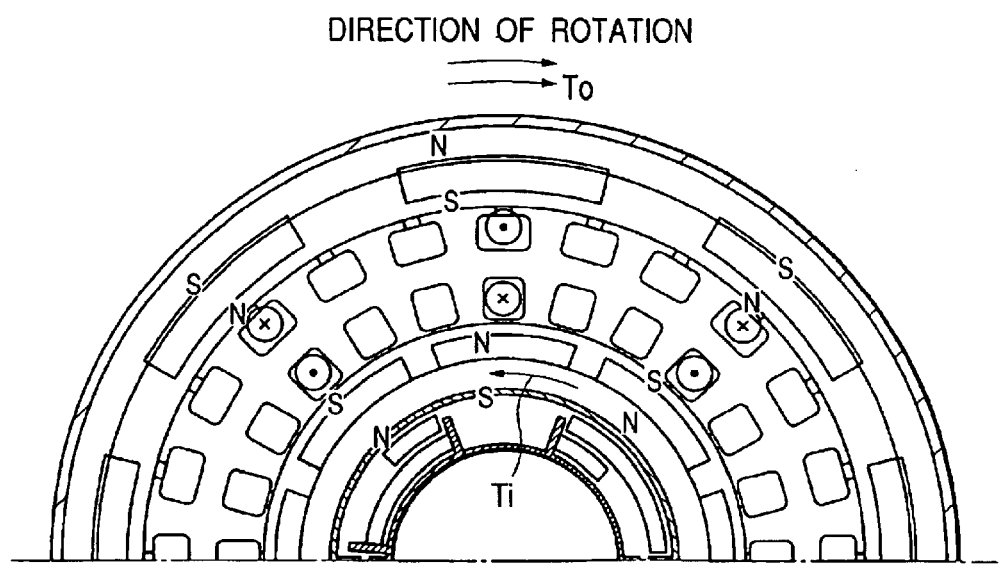
FIG. 17 is a sectional view which shows the phase of current flowing through armature coils controlled in a high-speed low-torque motor mode in the second embodiment.
Figure 18:
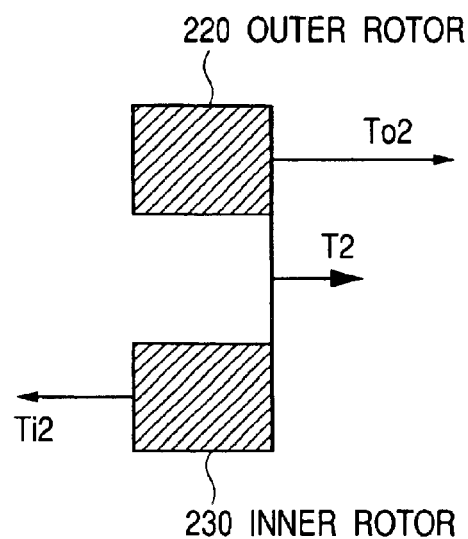
FIG. 18 is an illustration which shows torques acting on outer and inner rotors when the phase of current flowing through armature coils is controlled as shown in FIG. 17.

The angular relation between the magnets 221 and 231 in the high-speed low-torque motor mode or low-speed low-torque motor mode is shown in FIG. 17. The torques To2 and Ti2 produced on the outer and inner rotors 220 and 230 are shown in FIG. 18. The resultant torque T2 is given by |To2−Ti2| where To2>Ti2.

The operation of the synchronous machine in the generation mode (e.g., a regenerative braking mode of the vehicle) will be described below.

Figure 19:
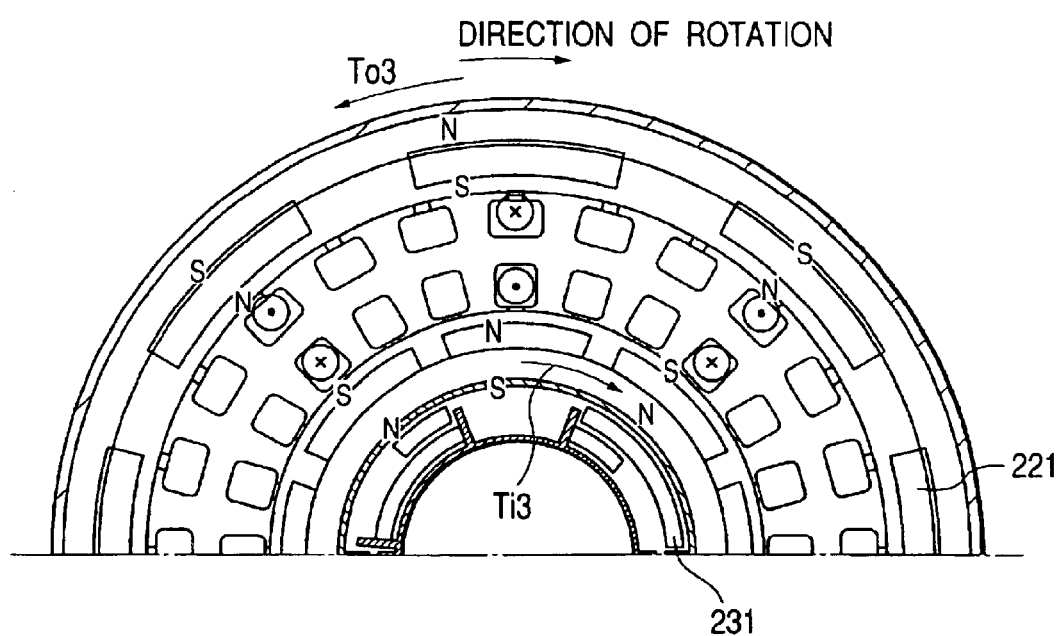
FIG. 19 is a sectional view which shows the phase of current flowing through armature coils controlled in a high-speed low-torque generator mode in the second embodiment.
Figure 20:
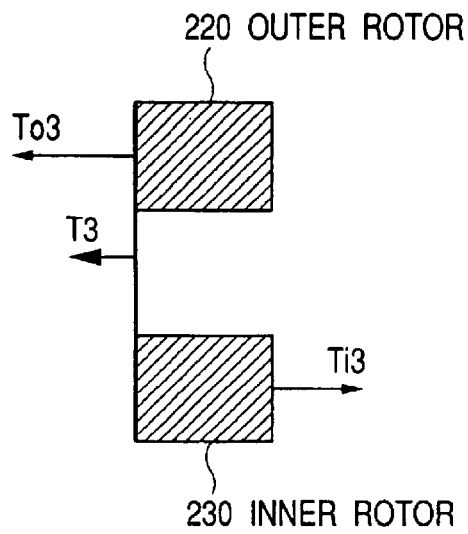
FIG. 20 is an illustration which shows torques acting on outer and inner rotors when the phase of current flowing through armature coils is controlled as shown in FIG. 19.

The generation in a high-speed low-torque mode or a low-speed low-torque mode is achieved by controlling the phase of the current flowing through the armature coils 212 as illustrated in FIG. 19. This control may be performed by supplying the current to the armature coils 212 in addition to the current induced in the armature coils 212 by the torque transmitted form the engine and the transmission. The resultant torque T3 is, as shown in FIG. 20, given by the relation of T3=To3−Ti3 where To3 is the torque acting on the outer rotor 220, and Ti3 is the torque acting on the inner rotor 230. Note that the elastically produced torque Tf is greater than the torque Ti3.

The switching from the state, as illustrated in FIGS. 19 and 20, to a high-torque generator mode (i.e., a low-speed high-torque generator mode) will be described below.

Figure 21:
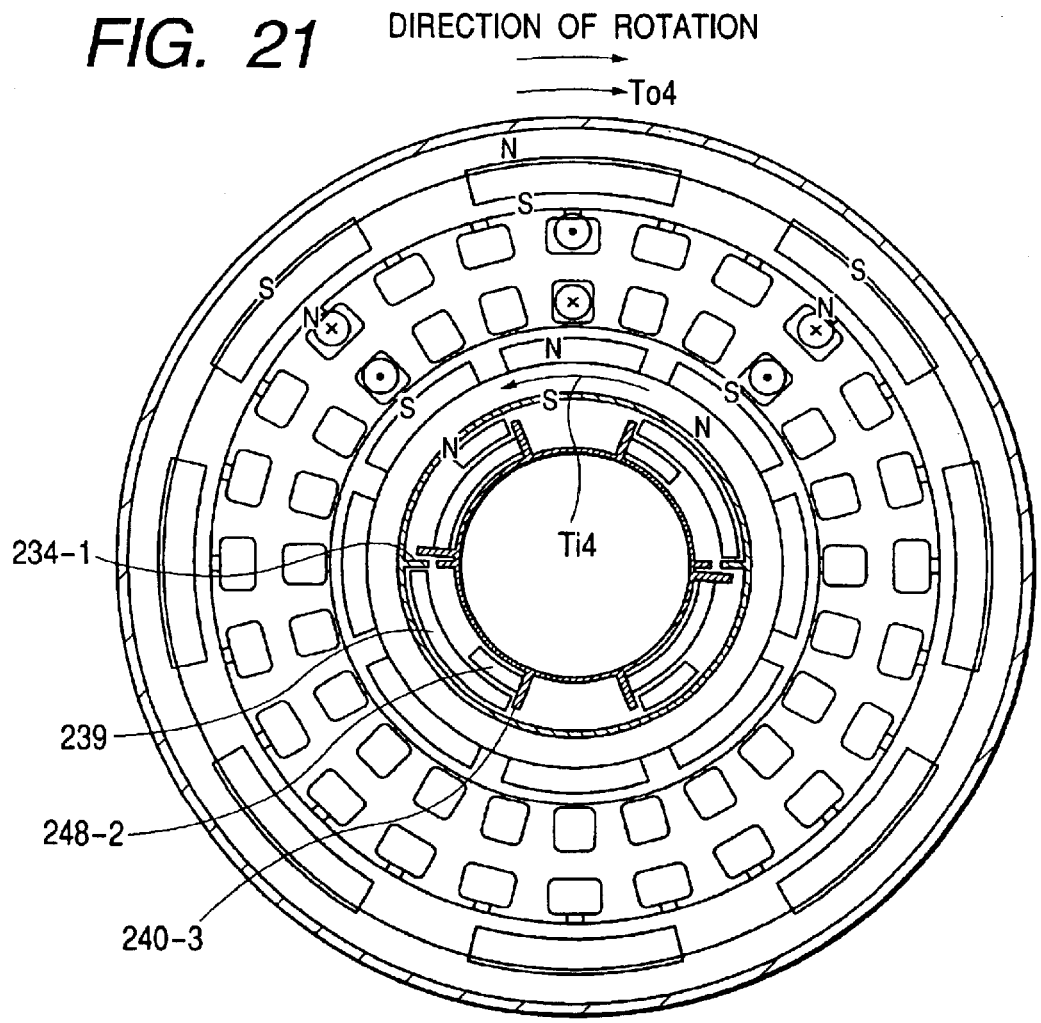
FIG. 21 is a sectional view which shows the phase of current flowing through armature coils controlled to change the relative angle between outer and inner rotors for establishing a high-torque generator mode in the second embodiment.
Figure 22:
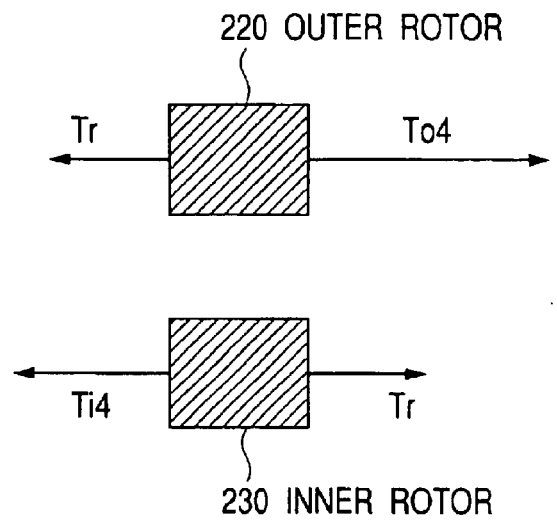
FIG. 22 is an illustration which shows torques acting on outer and inner rotors when the phase of current flowing through armature coils is controlled as shown in FIG. 21.
Figure 23:
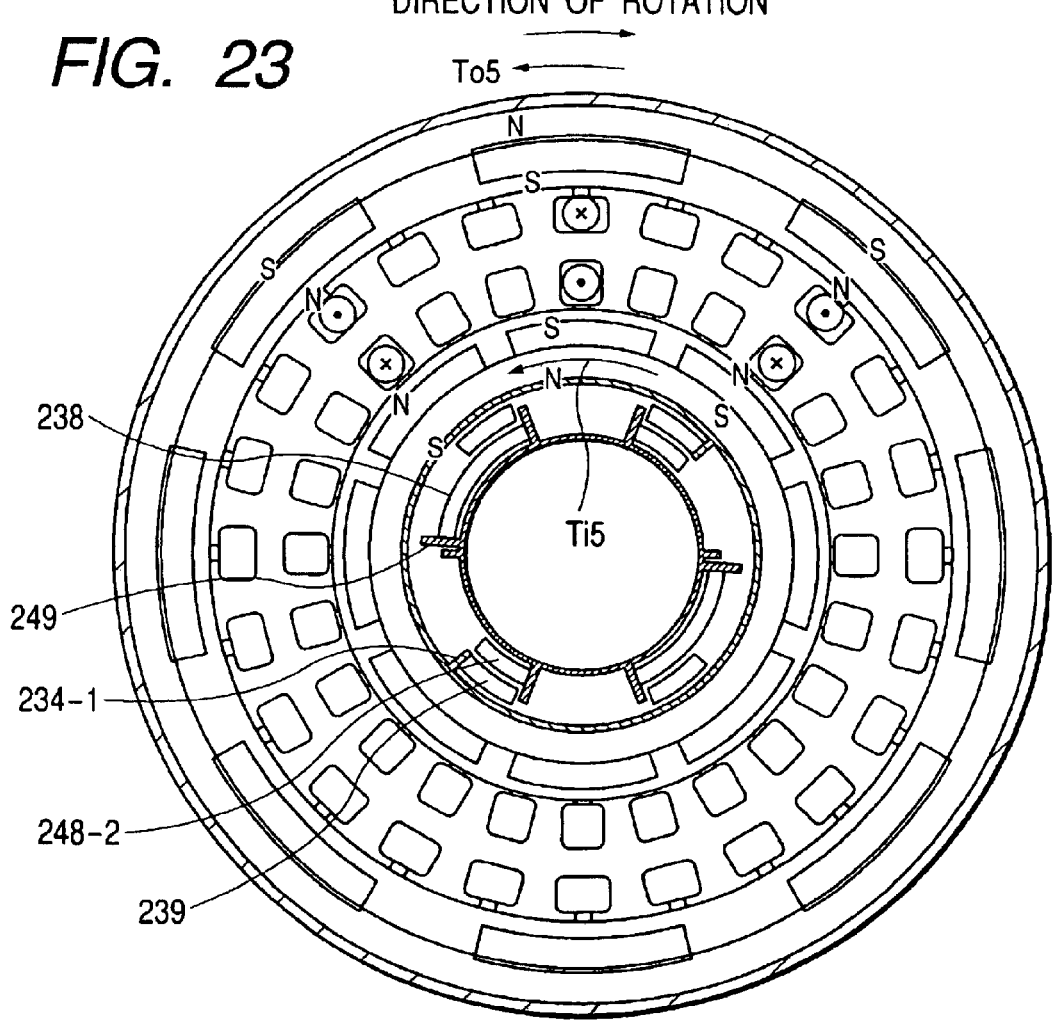
FIG. 23 is a sectional view which shows the phase of current flowing through armature coils controlled in a high-torque generator mode in the second embodiment.
Figure 24:
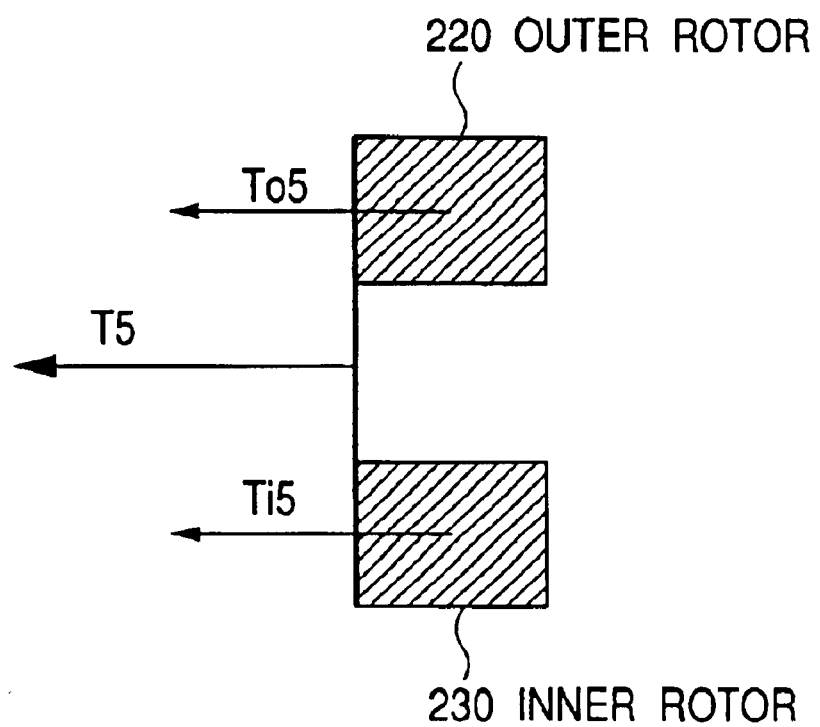
FIG. 24 is an illustration which shows torques acting on outer and inner rotors when the phase of current flowing through armature coils is controlled as shown in FIG. 23.

When the quantity of current flowing through the armature coils 212 is increased while controlling the phase thereof so that the magnets 231 of the inner rotor 230 may produce a maximum torque in the counterclockwise direction, the inner rotor 230, unlike the start-up mode of the engine operation, rotates relative to the outer rotor 220 in the counterclockwise direction while compressing the second elastic members 239, as shown in FIG. 23, thereby causing the torques, as shown in FIG. 24, to be produced. Specifically, the phase and quantity of the current flowing through the armature coils 212 is, as shown in FIG. 21, controlled so as to produce the torques To4 and Ti4, as shown in FIG. 22, acting on the outer and inner rotors 220 and 230, like the ones in FIG. 18. Note that the torque Tr is produced by the elastic load F2.

If the inertial mass of the outer rotor 220 and the inertial mass of the inner rotor 230 are defined as Io and Ii, and the angular accelerations thereof are defined as βo4, and βi4, respectively, relations between the torques and accelerations produced on the outer and inner rotors 220 and 230 may be expressed as $$To4-Tr=Io\cdot \beta o4$$

$$Ti4-Tr=Ii\cdot \beta i4$$

Since the inertial mass Io of the outer rotor 220 is much greater than the inertial mass Ii of the inner rotor 230, the inner rotor 230 starts to rotate more quickly than the outer rotor 220. Specifically, the ribs 234-1 of the inner rotor support stay 234 is urged by the counterclockwise torque Ti4 to compress the second elastic members 239 against the elastic load F2 produced by the second elastic members 239 and rotates to the angular position defined by the stoppers 248-2. The controlling the current, as shown in FIG. 23, to flow through the armature coils 212, causes the torques To5 and Ti5 to be produced, as shown in FIG. 24, on the outer and inner rotors 220 and 230, respectively. This causes the resultant toque T5=To5+Ti5 to be produced, thereby achieving the high-torque generation mode.

Figure 25:
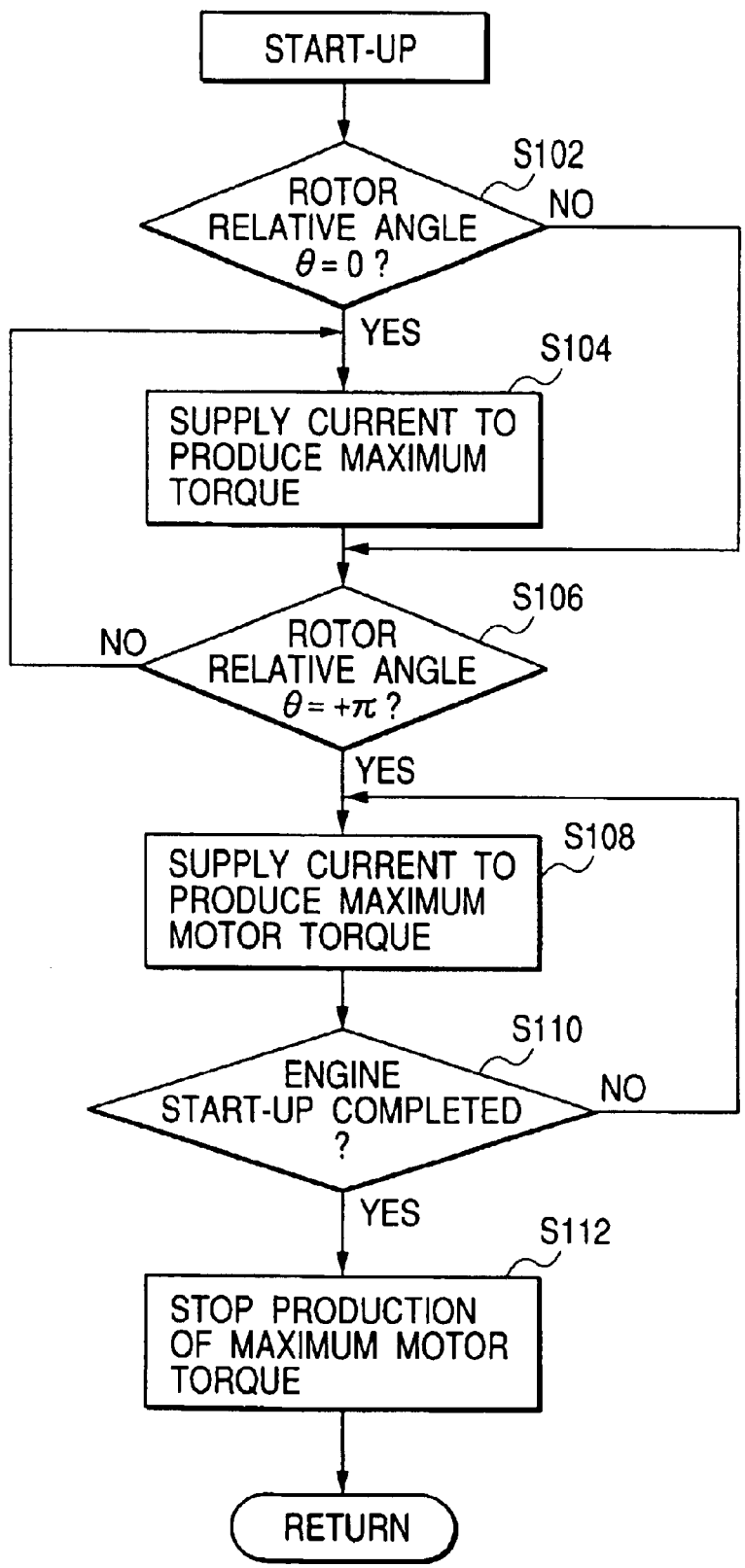
FIG. 25 is a flowchart of a program to be performed to operate a multi-rotor synchronous machine at the start-up of the engine.

FIG. 25 is a flowchart of a program to be performed to operate the multi-rotor synchronous machine in the motor mode at the start-up of the engine. An inverter used to supply the current to the armature coils 212 is installed in the controller 500 and has a know structure in which a total of six three-phase switching elements are installed on an upper and a lower arms and turned on and off selectively in a given sequence by a controller. The structure and operation of such an inverter is known in the art, and explanation thereof in detail will be omitted here.

When it is required to start the engine, the routine proceeds to step 102 wherein it is determined whether the relative angle θ between the outer and inner rotors 220 and 230 is zero (0) or not. The relative angle θ is determined by executing an interrupt routine (not shown) to monitor the angular positions of the outer and inner rotors 220 and 230 through the angle sensor 291 and calculating a difference therebetween. The fact that the relative angle θ is zero (0) means that the inner and outer rotors 220 and 230 are in the neutral position as illustrated in FIGS. 9 and 10.

If a YES answer is obtained meaning that the inner and outer rotors 220 and 230 are in the neutral position, then the routine proceeds to step 104 wherein the current of phase, as shown in FIG. 12, is supplied to the armature coils 212 to produce a maximum torque acting on the inner rotor 230 that is smaller in inertial mass than the outer rotor 220, thereby shifting the relative angle θ between the inner and outer rotors 220 and 230 through +π, as shown in FIG. 15, so that the sum of magnetic fluxes interlining with the inner and outer rotors 220 and 230 may be maximized.

The routine proceeds to step 106 wherein it is determined whether the relative angle θ has reached +π or not. If a NO answer is obtained, then the routine returns back to step 104. Alternatively, if a YES answer is obtained, then the routine proceeds to step 108 wherein the current of phase, as shown in FIG. 15 is supplied to the armature coils 212 to produce the maximum torque T1 in the normal direction of rotation of the synchronous machine which is required to star up the engine.

The routine proceeds to step 110 wherein it is determined whether the engine has been started or not. If a NO answer is obtained, then the routine returns back to step 108. Alternatively, if a YES answer is obtained, then the routine proceeds to step 112 wherein the supply of current to the armature coils 212 for producing the maximum motor torque is stopped and returns back to a main routine (not shown).

Figure 26:
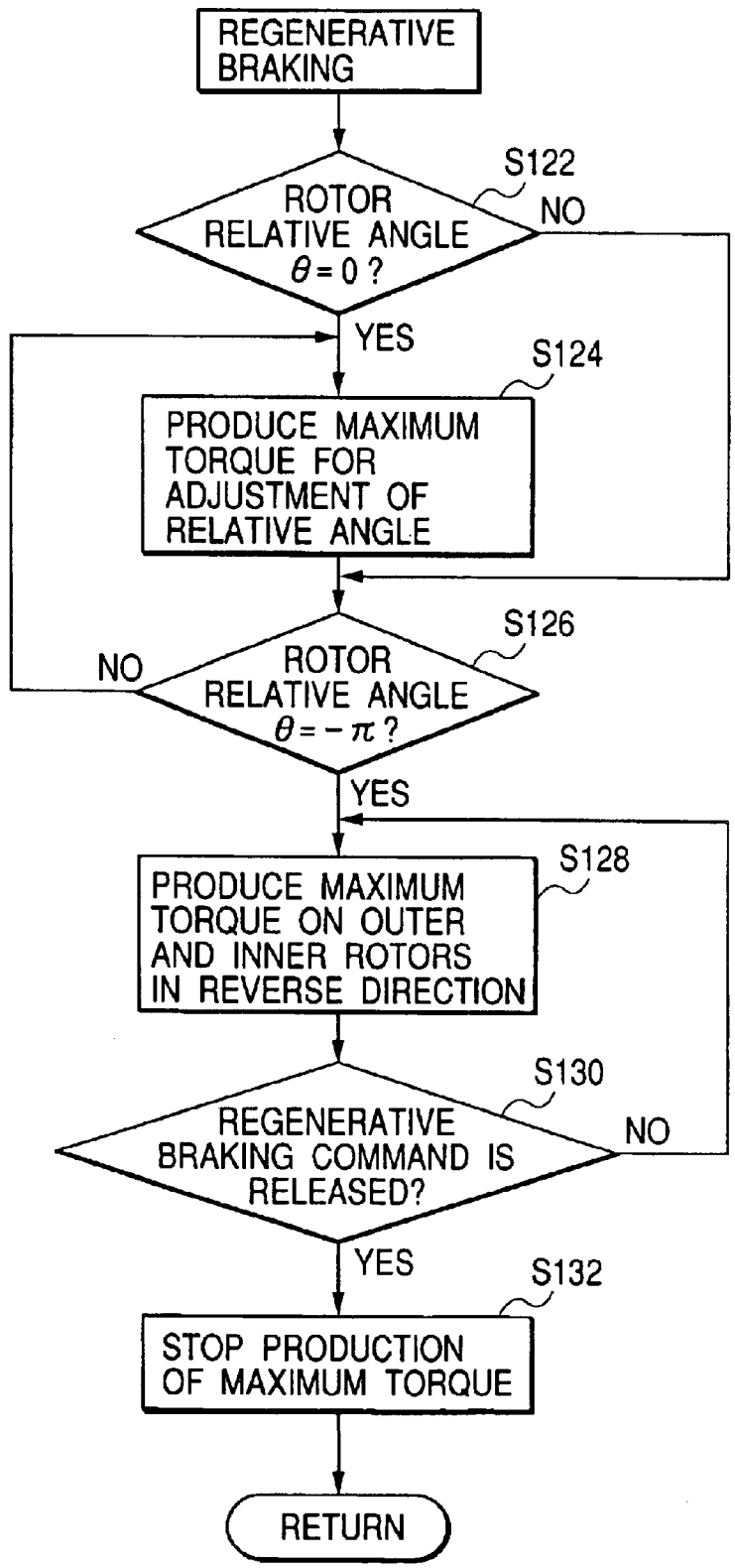
FIG. 26 is a flowchart of a program to be performed to operate a multi-rotor synchronous machine in a regenerative braking mode.

FIG. 26 shows a program to be performed to operate the multi-rotor synchronous machine in a regenerative braking mode.

When it is required to operate the multi-rotor synchronous machine as a generator during braking of the vehicle, the routine proceeds to step 122 wherein the relative angle θ between the outer and inner rotors 220 and 230 is calculated in the same manner as in step 102 in FIG. 25 to determine whether the relative angle θ is zero (0) or not. If a NO answer is obtained, then the routine proceeds directly to step 126. Alternatively, if a YES answer is obtained, then the routine proceeds to step 124 wherein the phase and quantity of current flowing through the armature coils 212 is, as shown in FIG. 21, controlled so as to produce a maximum torque acting on the inner rotor 230 in the counterclockwise direction to shift the relative angle θ between the inner and outer rotors 220 and 230 through −π, as shown in FIG. 23, so that the sum of magnetic fluxes interlining with the inner and outer rotors 220 and 230 may be maximized.

The routine proceeds to step 126 wherein it is determined whether the relative angle θ has reached −π or not. If a NO answer is obtained, then the routine returns back to step 124. Alternatively, if a YES answer is obtained, then the routine proceeds to step 128 wherein the phase and quantity of current flowing through the armature coils 212 is controlled so that a the maximum torque T5 may act on the inner and outer rotors 220 and 230 in the reverse direction of rotation.

The routine proceeds to step 130 wherein it is determined whether the regenerative braking command is released or not. If a NO answer is obtained, then the routine returns back to step 128. Alternatively, if a YES answer is obtained, then the routine proceeds to step 132 wherein the production of the torque in step 128 is stopped and returns back to a main routine (not shown).

The above program as illustrated in the flowchart of FIG. 25 refers only to control of the operation of the multi-rotor synchronous machine in the start-up mode of the engine operation, however, the multi-rotor synchronous machine of this embodiment may also be used under similar control for assisting in producing the output torque during rotation of the engine at high speeds.

The permanent magnet field poles may also be provided on either of the outer rotor 220 and the inner rotor 230. For example, the magnets 231 of the inner rotor 230 may be replaced with iron plates. In this case, the outer rotor 220 acts electromagnetically with the magnet 221, while the inner rotor 230 works to produce the reluctance torque in relation to the magnetic poles of the iron plates 231.

Figure 27:
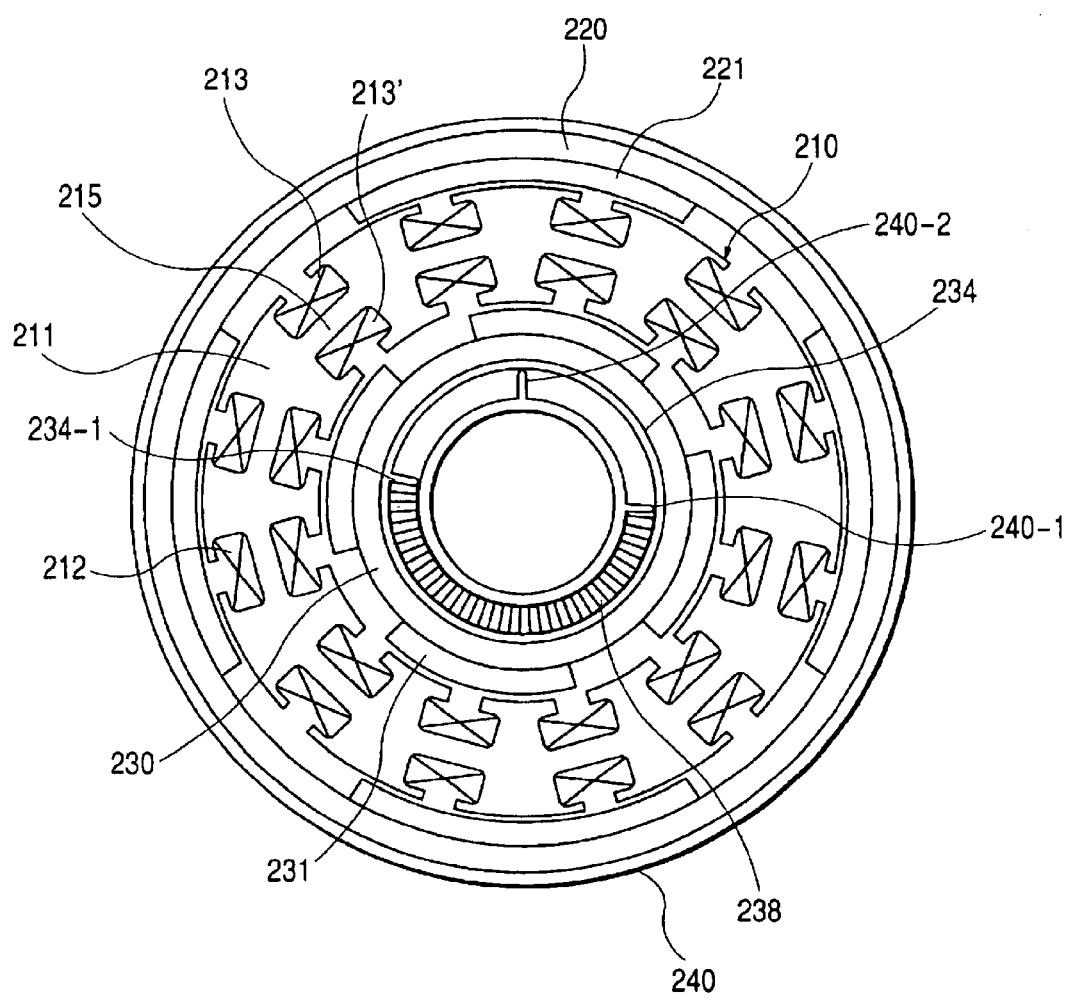
FIG. 27 is a sectional view which shows a multi-rotor synchronous machine according to the third embodiment of the invention.

FIG. 27 shows a multi-rotor synchronous machine according to the third embodiment of the invention. The same reference numbers as employed in the above embodiments will refer to the same parts, and explanation thereof in detail will be omitted here.

The multi-rotor synchronous machine of this embodiment has substantially the same structure as described in the second embodiment. Specifically, stator windings 212 (i.e., armature coils) are arrayed in a magnetic core 211 of a stator 210. Each stator winding 212 consists of a conductor shaped to form a number of loops or turns each of which extends from a front surface of the magnetic core 211 into one of slots 213' perpendicular to the drawing of FIG. 27, passes over a back surface of the core back 215, enters one of slots 213, and returns back to a front surface of the magnetic core 211. The armature coils 212 arrayed at a three-slot interval away from each other are coupled to form one of three-phase windings.

The multi-rotor synchronous machine also includes an outer rotor 220 and an inner rotor 230. Magnets 221 and 231 are secured on the outer and inner rotors 220 and 230.

A rotor support stay 240 is connected to a crankshaft 110 of the engine. A magnetic core 211 is installed on a stator support stay 250 through a pin 252. The stator support stay 250 is connected to an engine frame or transmission (not shown). An inner rotor support stay 234 which retains the inner rotor 230 is carried by bearings 235 and 236 to be slidable along the rotor support stay 240.

An elastic member 238 such as a coil spring is disposed around the inside periphery of the rotor support stay 240. The elastic member 239 is secured at one end thereof to the protrusion or rib 240-1 formed on the inside periphery of the rotor support stay 240 and at the other end thereof to the protrusion or rib 234-1 formed on the inner periphery of the inner rotor support stray 234.

Figure 28:
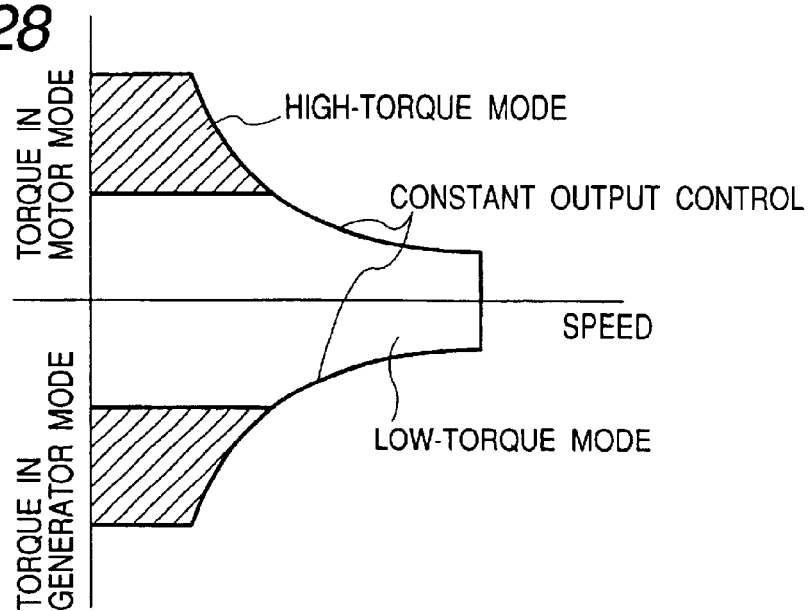
FIG. 28 is a graph which shows the relation between the speed of the synchronous machine of FIG. 27 and the produced torque in the third embodiment.

The operation of the multi-rotor synchronous machine used as an automotive generator/motor will be described below. The relation between the speed of the synchronous machine and the produced torque is illustrated in FIG. 28.

Figure 29:
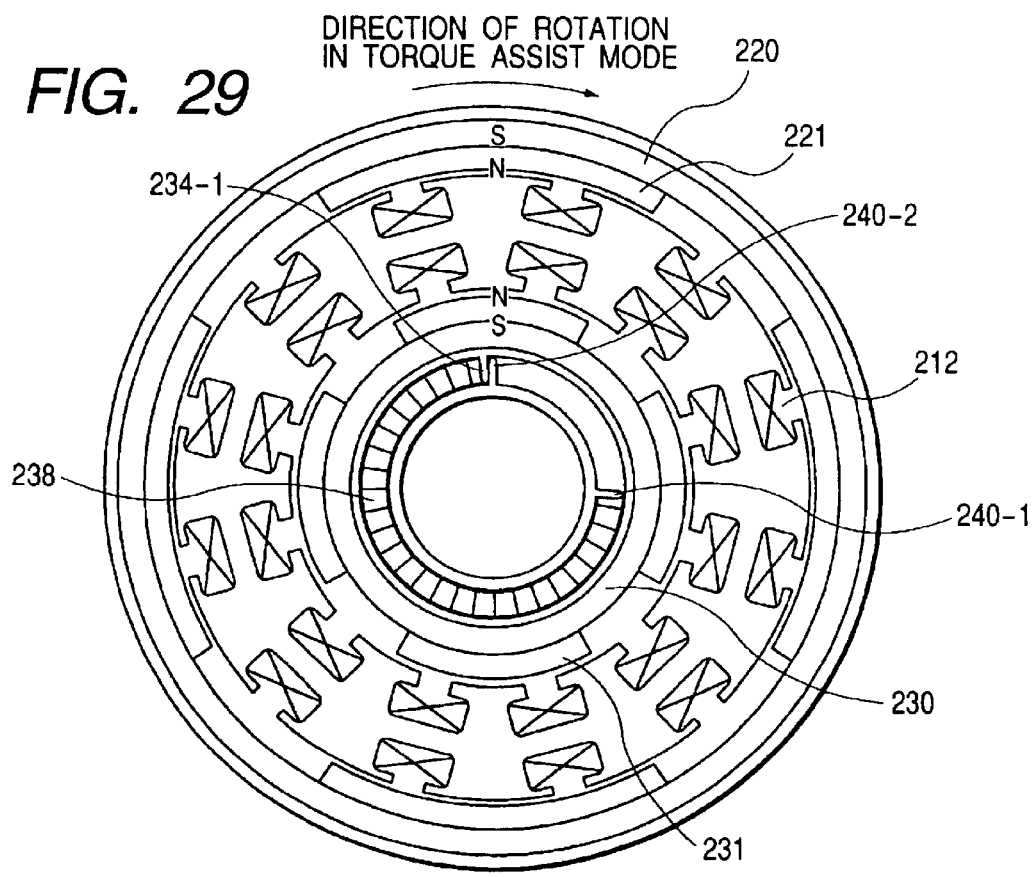
FIG. 29 is a sectional view which shows a positional relation between outer and inner rotors in a low-speed high-torque motor mode in the third embodiment.

FIG. 29 illustrates the state of the internal structural elements of the multi-rotor synchronous machine operating in a low-speed high-torque motor mode. The magnets 221 of the outer rotor 220 has a relative angle of zero (0) to the magnets 231 of the inner rotor 230. The magnetic flux produced by the magnets 221 of the outer rotor 220 so interlinks with the armature coils 212 as to produce a maximum torque. The relation between torques produced on the outer and inner rotors 220 and 230 and the phase of current flowing through the armature coils 212 is shown in FIG. 5.

Figure 30:
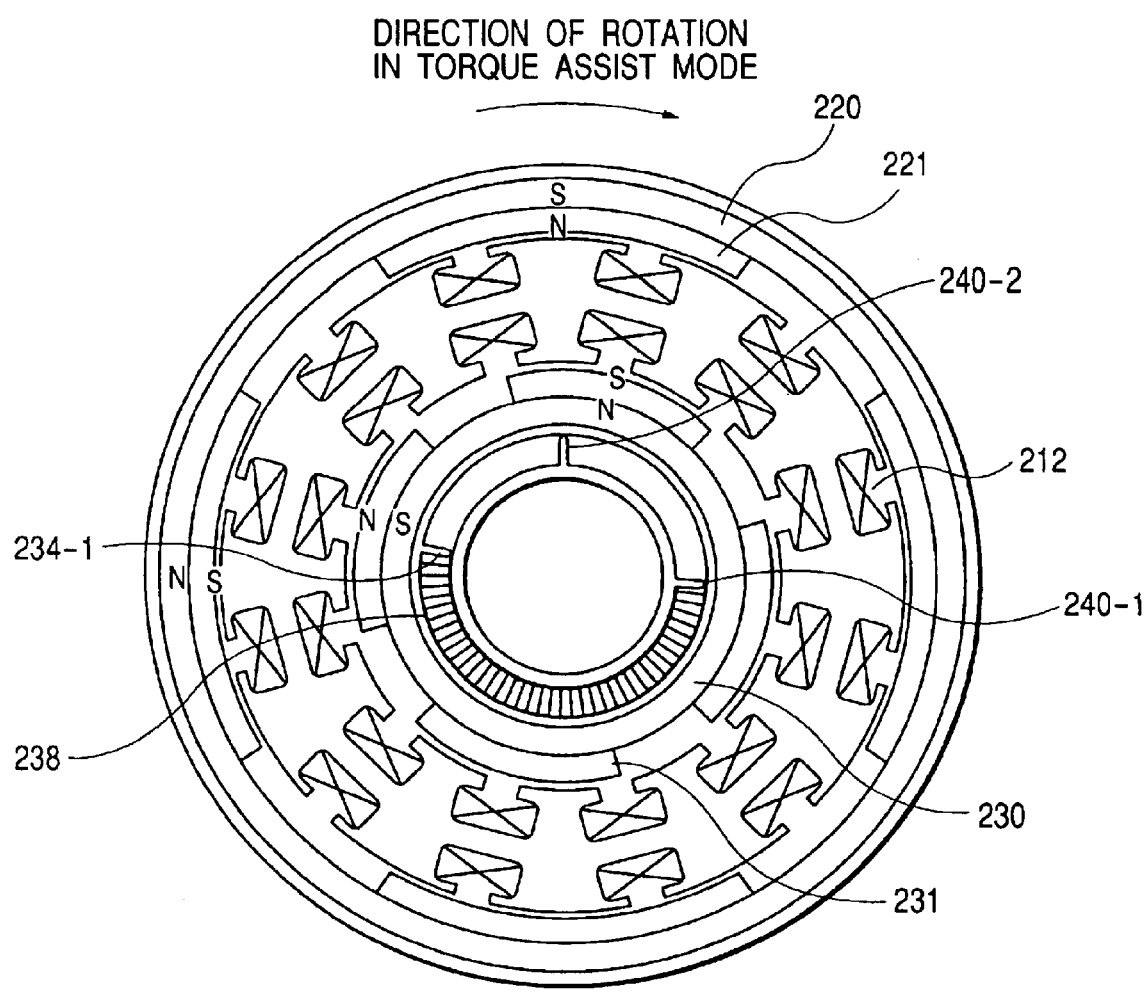
FIG. 30 is a sectional view which shows a positional relation between outer and inner rotors in a high-speed low-torque motor mode.

FIG. 30 shows the state of the internal structural elements of the multi-rotor synchronous machine operating in a high-speed low-torque motor mode. The magnets 221 of the outer rotor 220 are shifted in angular position from the magnets 231 of the inner rotor 230 so as to decrease the resultant magnetic flux interlinking with the armature coils 212, thereby resulting in a decrease in output torque, as shown in FIG. 4. The decrease in resultant magnetic flux causes the counter electromotive force produced in the armature coils 212 during rotation of the synchronous machine at high speeds to be reduced.

Figure 31:
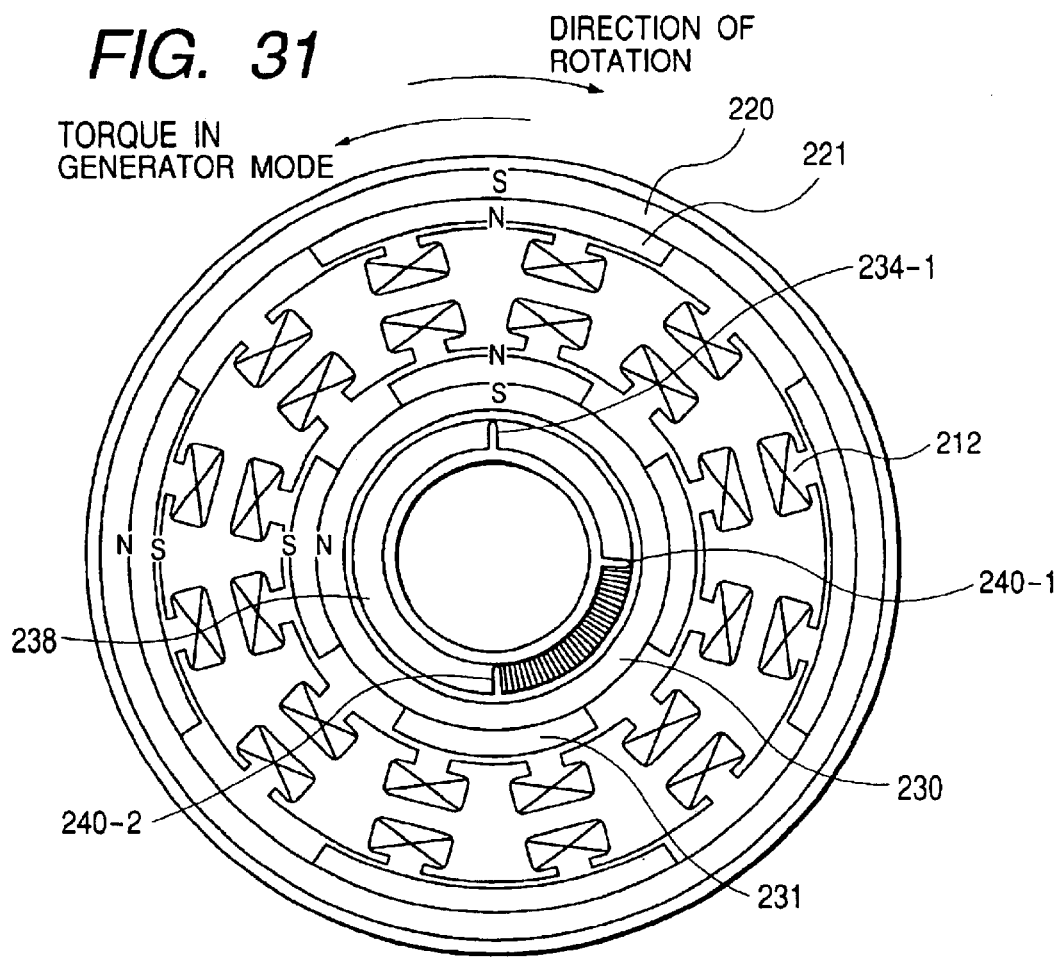
FIG. 31 is a sectional view which shows a positional relation between outer and inner rotors in a low-speed high-torque generator mode in the third embodiment.

FIG. 31 shows the state of the internal structural elements of the multi-rotor synchronous machine operating in a high-speed low-torque generator mode. The relative angle between the magnets 221 of the outer rotor 220 and the magnets 231 of the inner rotor 230 is shifted $2\pi$ from the one shown in FIG. 29. The resultant magnetic flux interlinking with the armature coils 212 is, like FIG. 29, maximized, thus causing the torque acting on the outer and inner rotors 220 and 230 to be maximized. This mode is suitable for the regenerative braking.

The switching from the high-speed low-torque motor mode to the low-speed high-torque generator mode will be described below.

In the high-speed low-torque motor mode, the magnets 221 of the outer rotor 220 and the magnets 231 of the inner rotor 230 have the positional relation as illustrated in FIG. 30. The elastic member 238 is laid, like the one shown in FIG. 27, between the ribs 240-1 and 234-1 without undergoing compression and expansion.

The switching from the state as illustrated in FIG. 30 to the low-speed high-torque generator mode is accomplished by controlling the phase and quantity of current flowing through the armature coils 212 so as to produce a maximum torque through the magnets 231 of the inner rotor 230 which compresses the elastic member 238, thereby causing the magnets 221 of the outer rotor 220 and the magnets 231 of the inner rotor 230 to have a relative angle as illustrated in FIG. 31. The change in current flowing through the armature coils 212 causes the torque produced by the magnets 221 of the outer rotor 220 to change, however, the pressure produced by the outer rotor 220 to compress the elastic member 238 is lower because of a difference in inertial mass between the outer rotor 220 and the inner rotor 230, so that the elastic member 238 contracts or expands mainly depending upon a change in torque produced by the magnets 231 of the inner rotor 230.

The switching from the high-speed low-torque motor mode to the low-speed high-torque motor mode will be described below which may be performed when it is required to assist in producing the output torque during rotation of the engine at low speeds.

The switching to the low-speed high-torque motor mode is accomplished by supplying the current to the armature coils 212 which has the phase to induce a magnetic force greater than the elastic pressure produced by the elastic member 238, thereby moving the inner rotor 230 relative to the outer rotor 220 to expand the elastic member 238 until the rib 234-1 of the inner rotor support stay 234 hits, as shown in FIG. 29, on the rib 240-2 of the rotor support stay 240. This control is performed when the engine speed is deceased, thus keeping the counterelectromotive voltage below an allowable level.

Figure 32:
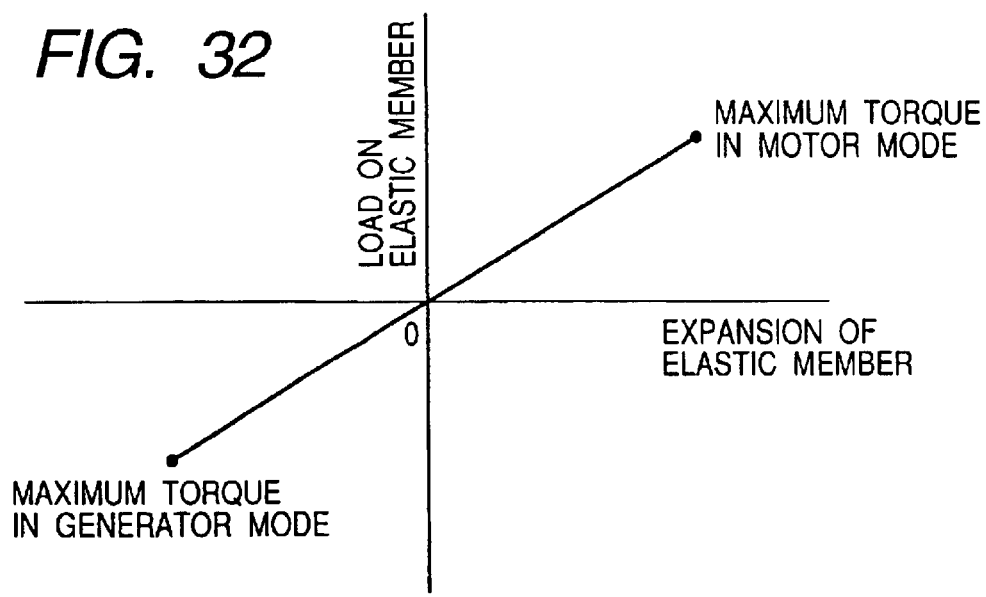
FIG. 32 is a graph which shows the relation between the amount of expansion of an elastic member and a load acting on the elastic member in the third embodiment of the invention.
Figure 33:
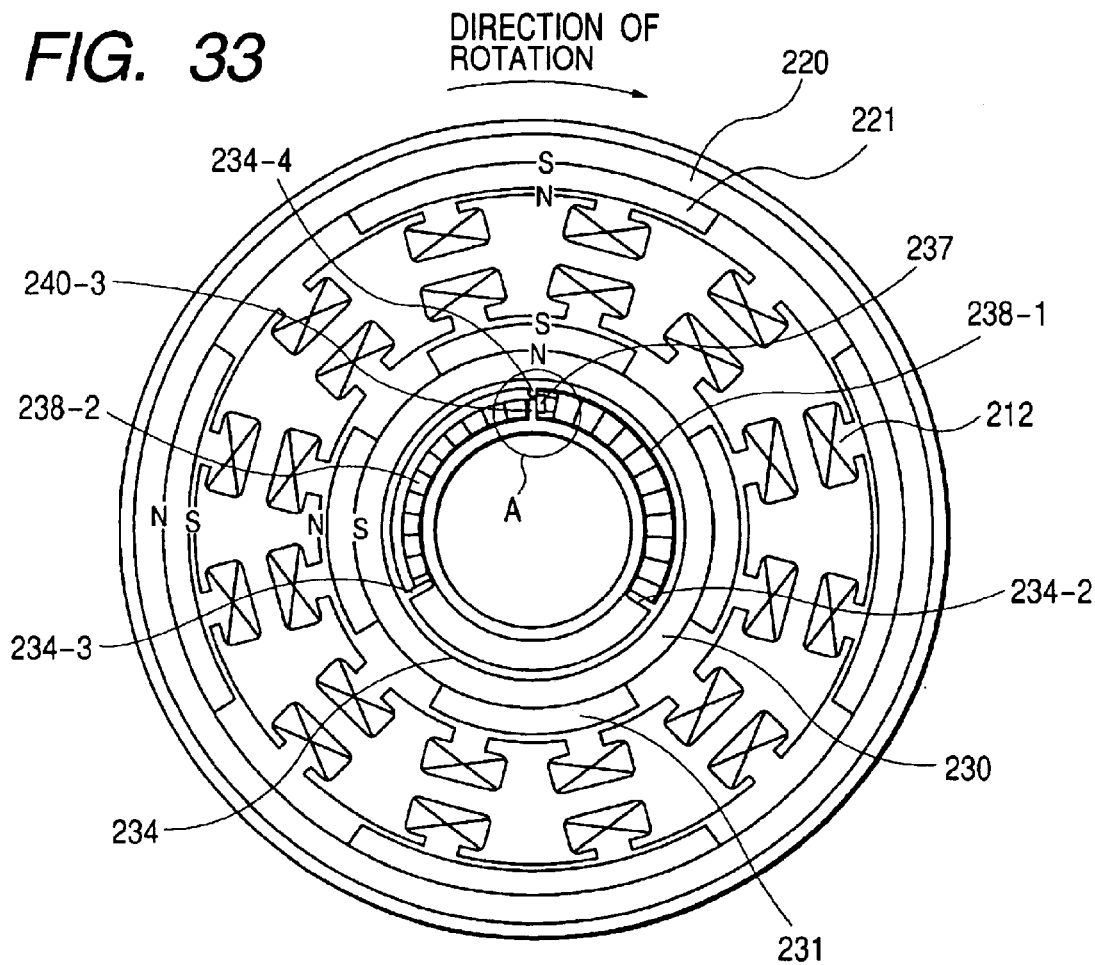
FIG. 33 is a sectional view which shows a multi-rotor synchronous machine according to the fourth embodiment of the invention.

The relation between the amount of expansion of the elastic member 238 and the load acting on the elastic member 238 is represented in FIG. 32.

FIGS. 33 to 37 show a multi-rotor synchronous machine according to the fourth embodiment of the invention which is different from the one of the third embodiment only in an outer rotor-to-inner rotor relative angle adjusting structure. Other arrangements are identical, and explanation thereof in detail will be omitted here.

The inner rotor 230 and the inner rotor support stay 234 are supported on the rotor support stay 240 rotatably.

Figure 34:
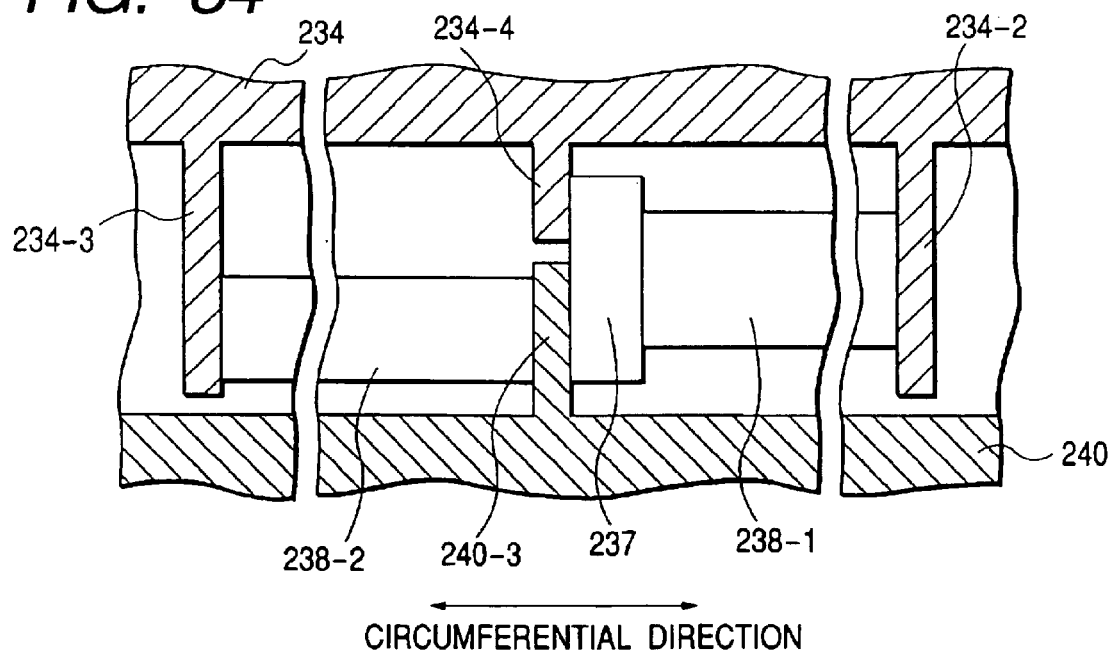
FIG. 34 is a sectional view, as developed in a circumferential direction of a multi-rotor synchronous machine, which shows an outer rotor-to-inner rotor relative angle adjusting structure according to the fourth embodiment of the invention.

The outer rotor-to-inner rotor relative angle adjusting structure is shown in FIG. 34 which is a sectional view developed in a circumferential direction of the multi-rotor synchronous machine.

Elastic members 238-1 and 238-2 are, like the above embodiments, disposed between the inner rotor support stay 234 and the rotor support stay 240. The elastic member 238-1 is in engagement at one end thereof with the rib 234-2 formed on the inner periphery of the inner rotor support stay 234 and at the other end thereof with the spacer 237. The elastic member 238-2 is in engagement at one end thereof with the rib 240-3 formed on the outer periphery of the rotor support stay 240 and at the other end thereof with the rib 234-3 formed on the inner periphery of the inner rotor support stay 234.

When not subjected to any load, the elastic members 238-1 and 238-2 are held at an angular position in which the rib 234-4 formed on the inner periphery of the inner rotor support stay 234 is in alignment with the rib 240-3 on the rotor support stay 240. In this position, the elastic pressure f1 produced by the elastic member 238-1 and the elastic pressure f2 produced by the elastic member 238-2 meet a relation of $f1 \geq f2$.

The switching from a low torque mode to a high torque mode of operation of the multi-rotor synchronous machine will be described below.

Figure 35:
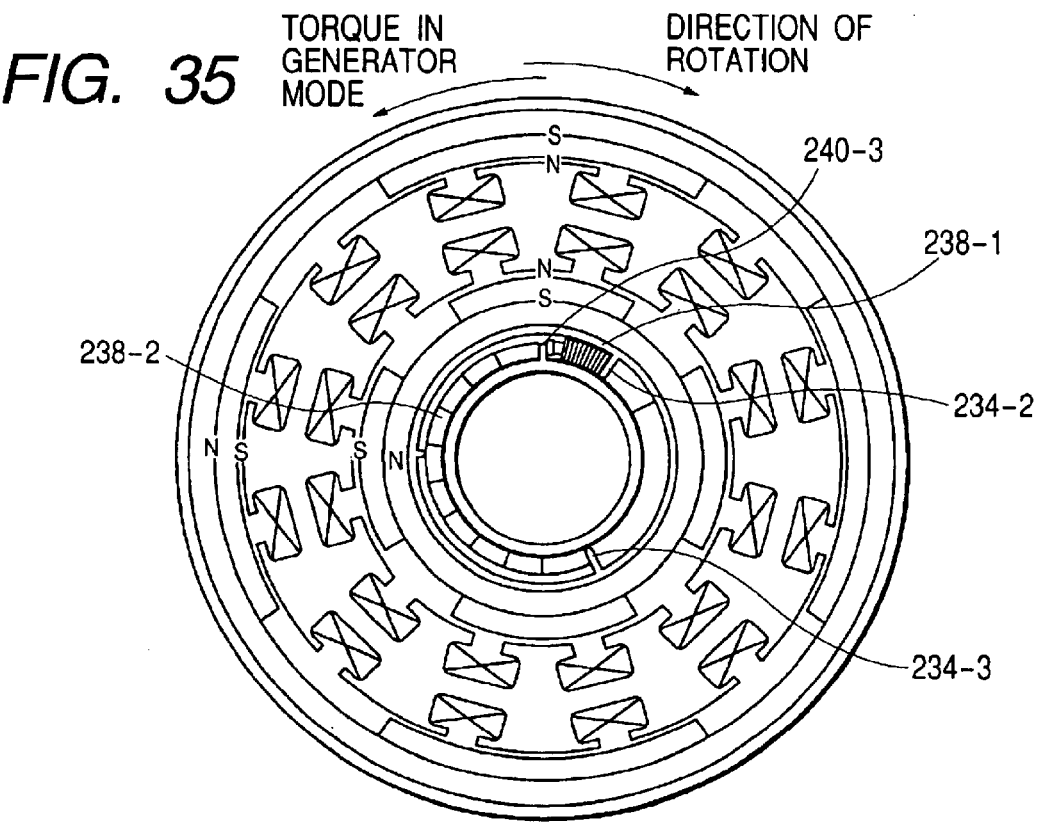
FIG. 35 is a sectional view which shows a multi-rotor synchronous machine operating in a generator mode.

In the generation mode of operation of the multi-rotor synchronous machine, the phase of current flowing through the armature coils 212 is controlled to produce on the inner rotor 230 the torque in a direction reverse to rotation thereof which is greater than a resultant pressure |f1−f2| of the elastic members 238-1 and 238-2, thereby causing, as shown in FIG. 35, the elastic member 238-1 to be compressed and the elastic member 238-2 to be expanded, so that the angular interval between the rib 240-3 of the rotor support stay 240 and the rib 234-2 of the inner rotor support stay 234 is decreased. The magnets 221 of the outer rotor 220 has a positional relation to the magnets 231 of the inner rotor 230 which creates a maximum magnetic flux interlinking with the armature coils 212, producing a maximum torque in the reverse direction (i.e., the counterclockwise direction as viewed in FIG. 35).

Figure 36:
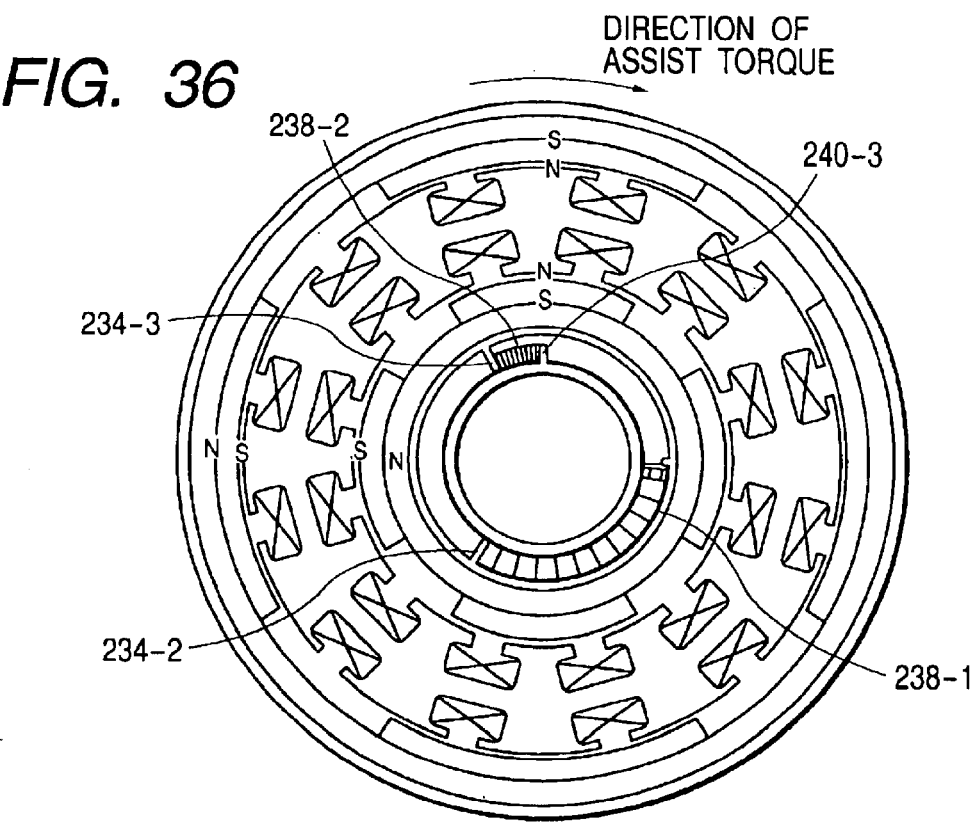
FIG. 36 is a sectional view which shows a multi-rotor synchronous machine operating in a motor mode.

In the motor mode, the phase of current supplied to the armature coils 212 is so controlled as to produce the torque which is greater than the elastic pressure of the elastic member 238-2 on the inner rotor 230 in the same direction as that in which the synchronous machine is to be rotated, thereby causing, as shown in FIG. 36, the elastic member 238-2 to be compressed, so that the angular interval between the rib 240-3 of the rotor support stay 240 and the rib 234-3 of the inner rotor support stay 234 is decreased. Both the magnetic flux produced by the magnets 221 of the outer rotor 220 and the magnetic flux produced by the magnets 231 of the inner rotor 230 interlinking with the armature coils 212 are maximized, thereby producing a maximum torque in the direction in which the synchronous machine is to be rotated (i.e., the clockwise direction as viewed in FIG. 36).

Figure 37:
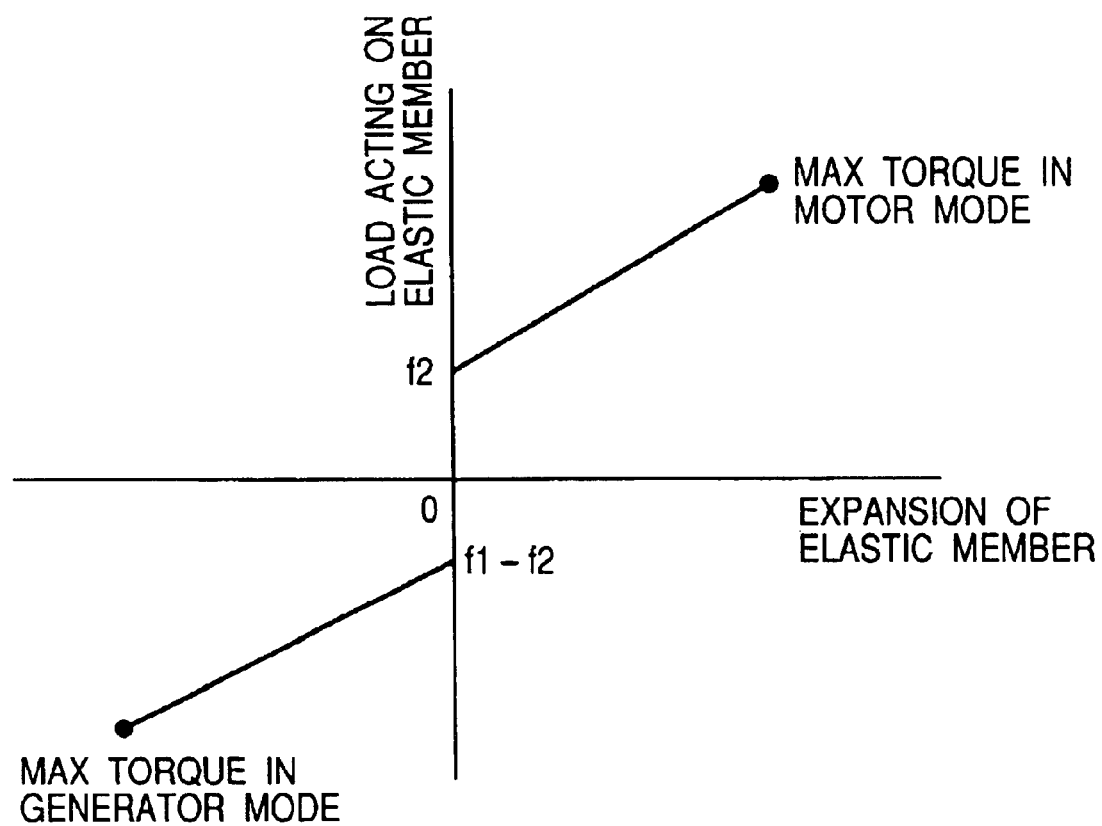
FIG. 37 shows a graph which represents the relation between the amount of expansion of elastic members and produced torque.

The relation between the amount of expansion of the elastic members 238-1 and 238-2 and the produced torque is shown in FIG. 37.

In the above embodiments, the outer and inner rotors 220 and 230 are arranged coaxially with each other, however, they may alternatively be arrayed tandem in the axial direction of the synchronous machine in a tandem.

In the second to fourth embodiments, when no current flows through the armature coils 212, the center of each magnet on the outer rotor 220 is in alignment with the center of one of the magnets on the inner rotor 230 in a radial direction, however, they may alternatively be shifted in angular position from each other.

Figure 38:
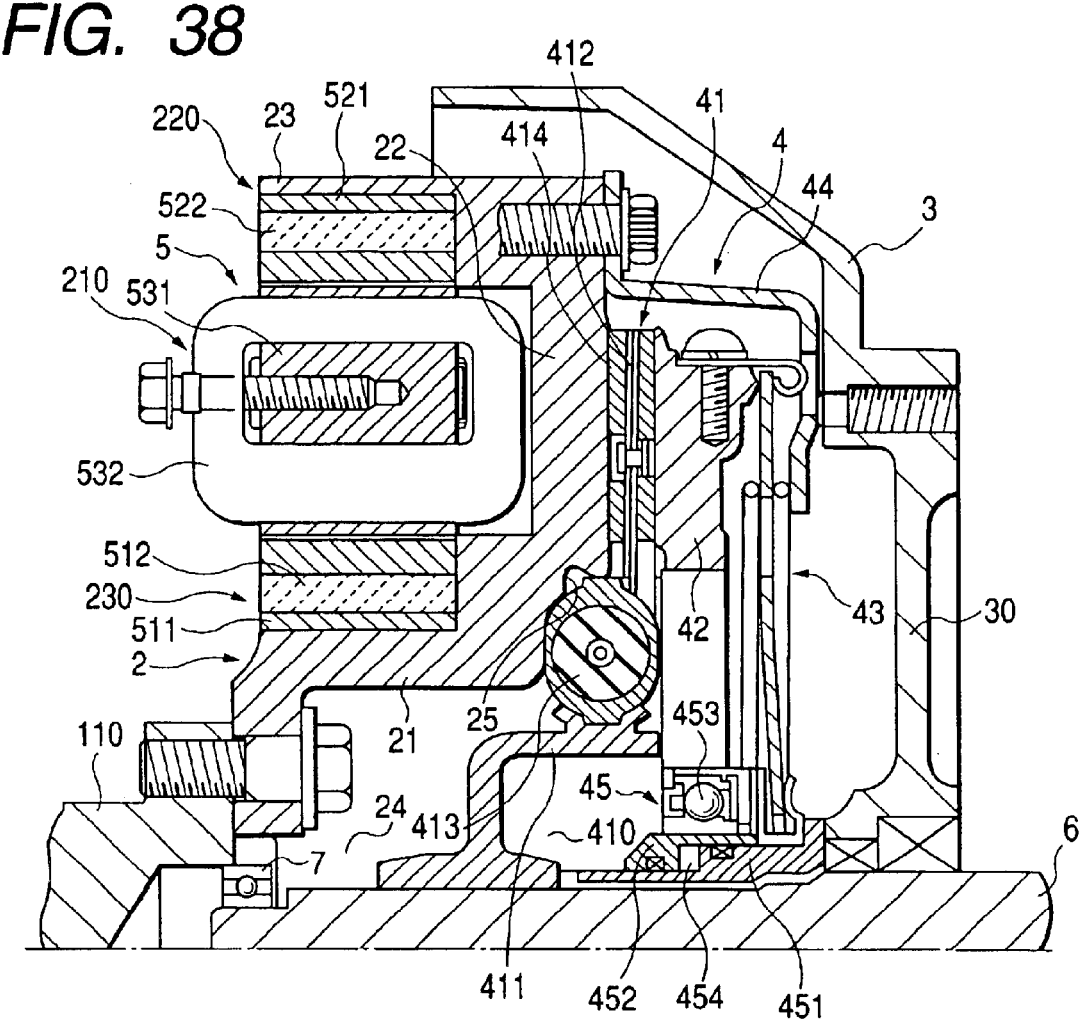
FIG. 38 is a sectional view which shows the part of an automotive power train according to the fifth embodiment of the invention in which a multi-rotor synchronous machine is installed as a generator/motor.
Figure 39:
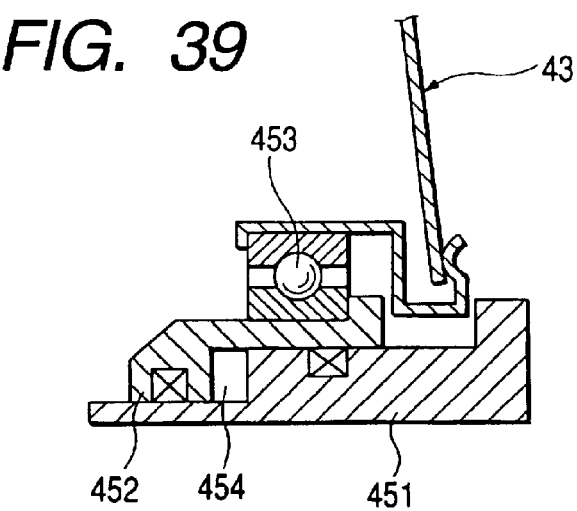
FIG. 39 is a partially sectional view which shows a connection of a clutch spring to a hydraulic pressure releasing mechanism.

FIG. 38 shows the part of an automotive power train according to the fifth embodiment of the invention in which a multi-rotor synchronous machine is installed as a generator/motor.

The generator/motor 5 is disposed in a housing 3 and coupled with a front surface of a flywheel 2. The flywheel 2 is secured to a crankshaft 110 leading to an internal combustion engine of the vehicle. The crankshaft 110 is connected at a rear end thereof to an input shaft 6 of a reduction gear mechanism or transmission in alignment therewith through a bearing 7. The input shaft 6 passes through the center of the flywheel 2 and connects with the crankshaft 110.

The flywheel 2 is secured to the rear end of the crankshaft 110 through bolts. The flywheel 2 is made up of a small-diameter cylinder 21 joined to the flywheel 2, a large-diameter cylinder 23 lying coaxially with the small-diameter cylinder 21, and a disc 22 extending radially to connect rear ends of the small-diameter and large-diameter cylinders 21 and 23. The small-diameter cylinder 21 has an opening 24 and a groove 25 formed in a rear end thereof.

A mechanical clutch 4 is fitted on the input shaft 6. The mechanical clutch 4 includes a clutch plate 41, a pressure plate 42, a clutch spring 43, a clutch cover 44, and a hydraulic pressure releasing mechanism 45.

The clutch plate 41 includes a hollow cylinder 411, a disc 412, and a clutch damper 413. The cylinder 411 has a recess 410 formed therein and is fitted on the input shaft 6 nonrotatably yet slidably in a lengthwise direction of the input shaft 6. The disc 412 extends from a rear end of the cylinder 411 to the rear end surface of the flywheel 2. The clutch damper 413 is disposed between the cylinder 411 and the disc 412 to connect them together and works to absorb a change in torque.

The disc 412 includes a frictional disc 414 which is engageble with the rear end surface of the flywheel 2. The clutch damper 413 is made of a rubber ring or a coil spring which extends around the cylinder 411 and is engagement at one end with the cylinder 411 and at the other end with the disc 412 so that it may be elastically deformed by a cyclic change in transmitted torque to absorb it. The clutch damper 413 is disposed at a front portion thereof in the groove 25 formed in the small-diameter cylinder 21 of the flywheel 2.

The pressure plate 42 is made of an annular plate and is placed in engagement with the rear end of the clutch plate 41. The pressure plate 42 is supported at an outer periphery thereof by the clutch cover 44 secured to on an outer end portion of the flywheel 2.

The clutch spring 43 is made of a disc plate which is deformable in the axial direction of the input shaft 6. The clutch spring 43 is in close engagement at an outer periphery thereof with the rear end surface of the pressure plate 42 and fitted at an inner periphery thereof, as clearly shown in FIG. 39, in the hydraulic pressure releasing mechanism 45 to be non-slidable backward. The clutch spring 43 is also in contact at a portion inside the outer periphery joined to the pressure plate 42 with an inner edge of the clutch cover 44. In the steady state, the clutch spring 43 is deformed in the axial direction of the input shaft 6 to urge the clutch plate 41 into constant engagement with the rear end surface of the flywheel 2 through the pressure plate 42, thereby establishing a connection of the flywheel 2 to the input shaft 6.

The hydraulic pressure releasing mechanism 45 includes a sleeve 451, a release piston 452, and a release bearing 453. The sleeve 451 is installed on a barrier plate 30 of the housing 3 and fitted on the input shaft 6 with a given play. The barrier plate 30 defines a reduction gear chamber and a clutch chamber. The release piston 452 is installed on the sleeve 451 to be slidable in the axial direction of the sleeve 451. The release bearing 453 is installed on the periphery of the release piston 452. The sleeve 451 and the release piston 452 define a hydraulic chamber 454 therebetween. The release bearing 453 is in engagement at an outer race thereof with the inner periphery of the clutch spring 43.

The disengagement of the clutch 4 is accomplished by supplying the hydraulic pressure into the hydraulic chamber 454 to advance the release piston 452 and the release bearing 453 together, so that the outer race of the release bearing 453 moves the inner periphery of the clutch spring 43 forward, thereby causing the outer periphery of the clutch spring 43 to move backward. This causes the pressure plate 42 to move backward because of the tight engagement of the outer periphery of the pressure plate 42 with the outer periphery of the clutch spring 43. The pressure urging the clutch plate 41 into constant engagement with the flywheel 2, thus, disappears, thereby releasing the engagement of the flywheel 2 with the input shaft 6.

The engagement of the clutch 4 is accomplished by releasing the hydraulic pressure from the hydraulic chamber 454 to produce the pressure urging the pressure plate 42 into constant engagement with the flywheel 2 through the clutch plate 41, which establishes the connection of the flywheel 2 to the input shaft 6.

The generator/motor 5 includes an outer rotor 220, an inner rotor 230, and a stator 210. The outer rotor 220 is installed on the inner periphery of the large-diameter cylinder 23 of the flywheel 2. The inner rotor 230 is installed on the outer periphery of the small-diameter cylinder 21 of the flywheel 2. The stator 210 is disposed between the inner rotor 230 and the outer rotor 220.

The inner rotor 230 includes a yoke 521 on which permanent magnets 512 are installed. The outer rotor 220 includes a yoke 521 on which permanent magnets 522 are installed. The stator 210 includes a iron core 531 in which armature coils 532 are installed. The armature coils 532 are each made up of a conductor shaped in a toroidal form. The iron core 531 is installed on the housing 3. In the motor mode of operation of the generator/motor, the supply of current to the armature coils 532 causes the outer and inner rotors 220 and 230 to rotate to produce the torque acting on the crankshaft 1. In the generator mode, the torque is transmitted from the crankshaft 1 to the outer and inner rotors 220 and 230, thereby inducing the current in the armature coils 532.

As apparent from the above discussion, the release piston 452 and the release bearing 453 are disposed ahead of the clutch spring 43. The clutch spring 42 is designed to be hydraulically urged forward through the release bearing 452 to disengage the clutch 4. This eliminates the need for defining a chamber required to install hydraulic pressure releasing mechanism behind the clutch spring 43, thus allowing the overall length of the power train to be decreased as compared with a conventional structure in which a hydraulic pressure releasing mechanism is installed behind a clutch spring.

Additionally, the release bearing 453 is fitted on the release piston 452, thus allowing the length of the power train to be decreased by an amount equivalent to the thickness of the release bearing 453 as compared with the conventional structure. Further, the release bearing 453 does not face the clutch plate 41 through the release piston 452, thus allowing a required interval between the outer race of the release bearing 453 and the inner periphery of the clutch plate 41 in the axial direction of the power train to be decreased, which allows the release bearing 453 to urge the clutch plate 41 into constant engagement with the flywheel 2 through the pressure plate 42 under a decreased elastic pressure.

The generator/motor 5 may alternatively have any of the structures of the above described first to fourth embodiments.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A multi-rotor synchronous machine, comprising:
a pair of rotors at least one of which has permanent magnet field poles, said rotors being arrayed coaxially to be rotatable relative to each other;
a stator core;
armature coils wound in said stator core, interlinking with a field flux produced by said rotors;
a sensor measuring a relative angle between said rotors; and
a rotor-to-rotor relative angle controller working to establish a relative rotation between said rotors to change the relative angle measured by said sensor to a target angle, wherein:
said stator core is made of a hollow cylindrical member,
said rotors are an outer rotor disposed around an outer periphery of said stator core and an inner rotor disposed around an inner periphery of said stator core,
said rotor-to-rotor relative angel controller includes a relative rotation controlling mechanism disposed inside said inner rotor for controlling a relative rotation between said rotors,
said relative rotation controlling mechanism includes an elastic member laid between said rotors in a circumferential direction thereof to keep said rotors in a neutral position, and
said rotor-to-rotor relative angle controller changes magnetic torques acting on said rotors to adjust a relative angle between said rotors to a target angle.

2. A multi-rotor synchronous machine as set forth in claim 1, wherein said rotor-to-rotor relative angle controller is designed to change the magnetic torque acting on said rotors to rotate one of said rotors relative to the other from the neutral position while compressing or expanding said elastic member, thereby adjusting the relative angle between said rotors to the target angle.

3. A multi-rotor synchronous machine as set forth in claim 1, wherein said relative rotation controlling mechanism includes a pair of elastic members secured on one of said rotors to establish the neutral position in which said rotors have a preselected angular relation therebetween when the armature coils is deenergized, and wherein said rotor-to-rotor relative angle controller changes the magnetic torques acting on said rotor to cause one of the elastic members to be compressed while expanding the other elastic member, thereby adjusting the relative angle between said rotors to the target angle.

4. A multi-rotor synchronous machine as set forth in claim 2, wherein said relative rotation controlling mechanism includes a pair of stoppers working to define a relative rotation allowable range of said rotors.

5. A multi-rotor synchronous machine as set forth in claim 4, wherein when said rotors are in a first relative angular position lying one of limits of the relative rotation allowable range defined by one of the stopper, a maximum torque is produced on said rotors in a direction of rotation of the multi-rotor synchronous machine, when said rotors are in a second relative angular position lying the other limit of the relative rotation allowable range defined by the other stopper, a maximum torque being produced on said rotors in a direction reverse to the direction of rotation of the multi-rotor synchronous machine.

6. A multi-rotor synchronous machine as set forth in claim 1, wherein one of said rotors has an inertial mass two times greater than that of the other rotor or more.

7. A multi-rotor synchronous machine as set forth in claim 6, wherein one of said rotors having the greater inertial mass is coupled to a crankshaft of an automotive engine, and the other rotor is coupled to the one of said rotors through said rotor-to-rotor relative angle controller to be rotatable relative to the one of said rotors.

8. A multi-rotor synchronous machine as set forth in claim 1, wherein the relative rotation controlling mechanism establish an engagement between said rotors so as to allow said rotors to rotate relative to each other continuously in a given angular range.

* * * * *